United States Patent
Song et al.

(10) Patent No.: US 12,436,229 B2
(45) Date of Patent: Oct. 7, 2025

(54) SIGNAL PROCESSING METHOD AND APPARATUS, AND STORAGE MEDIUM

(71) Applicant: SHENZHEN YINWANG INTELLIGENT TECHNOLOGIES CO., LTD., Shenzhen (CN)

(72) Inventors: Sida Song, Beijing (CN); Sha Ma, Beijing (CN); Lei Gao, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 340 days.

(21) Appl. No.: 17/946,473

(22) Filed: Sep. 16, 2022

(65) Prior Publication Data
US 2023/0014866 A1 Jan. 19, 2023

Related U.S. Application Data

(63) Continuation of application No. PCT/CN2020/079601, filed on Mar. 17, 2020.

(51) Int. Cl.
G01S 7/02 (2006.01)

(52) U.S. Cl.
CPC ............ *G01S 7/023* (2013.01); *G01S 7/0232* (2021.05); *G01S 7/0235* (2021.05)

(58) Field of Classification Search
CPC ...... G01S 7/023; G01S 7/0232; G01S 7/0235; G01S 7/021; G01S 7/36; G01S 13/931
USPC .............................................. 342/17, 18, 16
See application file for complete search history.

(56) References Cited

U.S. PATENT DOCUMENTS

| | | | | |
|---|---|---|---|---|
| 3,618,089 A | * | 11/1971 | Moran, Jr. ............ | G01S 13/103 342/135 |
| 4,010,468 A | * | 3/1977 | Fishbein ................. | G01S 13/02 342/92 |
| 4,328,495 A | * | 5/1982 | Thue ....................... | G01S 13/53 342/132 |
| 4,628,312 A | * | 12/1986 | Hwang ................. | G01S 7/2928 340/870.24 |

(Continued)

FOREIGN PATENT DOCUMENTS

| | | |
|---|---|---|
| CN | 1819496 A | 8/2006 |
| CN | 103257346 A | 8/2013 |

(Continued)

OTHER PUBLICATIONS

Office Action in Chinese Appln. No. 202080005166.6, dated Sep. 16, 2021, 11 pages (with English translation).

(Continued)

*Primary Examiner* — Michael W Justice
(74) *Attorney, Agent, or Firm* — Fish & Richardson P.C.

(57) ABSTRACT

Embodiments of this application provide a signal processing method and apparatus, and a storage medium, applied to the radar field. One example method includes: performing channel listening based on a first signal and a second signal, and determining, based on a result of the channel listening, a first time-frequency resource for target detection, where the channel listening includes performing channel listening based on a first listening signal in a first time domain range and performing channel listening based on a second listening signal in a second time domain range, and a time domain resource of the first time-frequency resource is the first time domain range.

20 Claims, 20 Drawing Sheets

(56) References Cited

U.S. PATENT DOCUMENTS

| | | | |
|---|---|---|---|
| 6,856,276 B2* | 2/2005 | Barrick | G01S 13/003 342/195 |
| 7,068,211 B2* | 6/2006 | Oswald | H01Q 1/38 342/72 |
| 7,227,493 B2* | 6/2007 | Oswald | G01S 13/46 342/146 |
| 7,986,966 B2* | 7/2011 | Sekiya | G01S 7/021 370/479 |
| 8,180,392 B2* | 5/2012 | Sekiya | G01S 7/021 370/479 |
| 9,772,397 B1* | 9/2017 | Bordes | G01S 7/0232 |
| 10,324,165 B2* | 6/2019 | Bordes | G01S 13/325 |
| 10,548,157 B2* | 1/2020 | Zhang | H04W 72/51 |
| 10,830,867 B2* | 11/2020 | Lin | G01S 13/86 |
| 11,175,376 B2* | 11/2021 | Melzer | G01S 7/352 |
| 11,175,377 B2* | 11/2021 | Bordes | G01S 7/0235 |
| 11,353,549 B2* | 6/2022 | Jansen | G01S 13/343 |
| 11,520,003 B2* | 12/2022 | Stettiner | G01S 7/0232 |
| 11,656,321 B2* | 5/2023 | Chen | G01S 7/023 342/28 |
| 2003/0025629 A1* | 2/2003 | Barrick | G01S 13/87 342/159 |
| 2003/0151541 A1* | 8/2003 | Oswald | B60R 21/01538 342/72 |
| 2004/0066323 A1 | 4/2004 | Richter | |
| 2004/0119633 A1* | 6/2004 | Oswald | G01S 13/46 342/146 |
| 2009/0061780 A1* | 3/2009 | Sekiya | G01S 7/021 455/63.1 |
| 2011/0267958 A1* | 11/2011 | Sekiya | G01S 7/021 370/241 |
| 2012/0176266 A1 | 7/2012 | Lee et al. | |
| 2015/0234048 A1 | 8/2015 | Miller et al. | |
| 2017/0010344 A1 | 1/2017 | Corbett | |
| 2017/0048879 A1* | 2/2017 | Zhang | H04W 76/27 |
| 2018/0031674 A1* | 2/2018 | Bordes | G01S 7/0234 |
| 2019/0011533 A1 | 1/2019 | Ginsburg et al. | |
| 2019/0056476 A1* | 2/2019 | Lin | G01S 7/021 |
| 2019/0195985 A1 | 6/2019 | Lin et al. | |
| 2019/0271767 A1 | 9/2019 | Keilaf et al. | |
| 2019/0302224 A1* | 10/2019 | Bordes | G01S 7/0232 |
| 2019/0383925 A1 | 12/2019 | Gulati et al. | |
| 2020/0025867 A1* | 1/2020 | Chen | G01S 7/0232 |
| 2020/0072941 A1* | 3/2020 | Jansen | G01S 13/343 |
| 2020/0088838 A1* | 3/2020 | Melzer | G01S 7/352 |
| 2020/0393536 A1* | 12/2020 | Stettiner | G01S 13/343 |

FOREIGN PATENT DOCUMENTS

| | | |
|---|---|---|
| CN | 105785325 A | 7/2016 |
| CN | 106772261 A | 5/2017 |
| CN | 107959646 A | 4/2018 |
| CN | 108646295 A | 10/2018 |
| CN | 109407088 A | 3/2019 |
| DE | 102013210256 A1 | 12/2014 |
| JP | 2008292264 A | 12/2008 |
| JP | 2015083931 A | 4/2015 |
| JP | 2016505810 A | 2/2016 |
| JP | 2017003347 A | 1/2017 |
| JP | 2018059871 A | 4/2018 |
| JP | 2019144083 A | 8/2019 |

OTHER PUBLICATIONS

International Search Report and Written Opinion in International Appln. No. PCT/CN2020/079601, mailed on Dec. 16, 2020, 14 pages (with English translation).

Extended European Search Report in European Appln No. 20926331.8, dated Mar. 24, 2023, 7 pages.

Office Action in Japanese Appln. No. 2022-555937, mailed on Jun. 26, 2023, 11 pages (with English translation).

* cited by examiner

SIGNAL PROCESSING METHOD AND APPARATUS, AND STORAGE MEDIUM

CROSS-REFERENCE TO RELATED APPLICATIONS

This application is a continuation of International Application No. PCT/CN2020/079601, filed on Mar. 17, 2020, the disclosure of which is hereby incorporated by reference in its entirety.

TECHNICAL FIELD

This application relates to the field of communication technologies, and in particular, to a signal processing method and apparatus, and a storage medium.

BACKGROUND

In a driving process of a vehicle, a radar (especially a millimeter-wave radar) can detect possible dangers in advance, so that an autonomous vehicle or a driver takes necessary preventive measures in time, which effectively improves safety and comfort during vehicle driving. However, as penetration rates of a vehicle-mounted radar and a road side unit including a radar increase, mutual interference between radars becomes increasingly severe. Consequently, a probability of radar detection is greatly reduced or a false alarm probability is increased, which severely affects driving safety and user comfort.

In the conventional technology, to avoid interference between the radars, the radars may randomly select transmission time in use. This avoids interference caused by a periodic radar signal to a radar on another vehicle or road side unit.

However, although the radars may randomly select the transmission time to reduce periodic interference between the radars, interference between the radars cannot be eliminated. When a radar receives a transmit signal of another radar, regardless of whether the transmit signal is periodic, measurement of a target is affected, resulting in inaccuracy of a detection result. In addition, a driving safety issue and a user comfort issue still exist.

SUMMARY

Embodiments of this application provide a signal processing method and apparatus, and a storage medium, to resolve a driving safety issue and a user comfort issue caused by an inaccurate detection result of an existing target detection method.

According to a first aspect, an embodiment of this application provides a signal processing method, including: performing channel listening based on a first signal and a second signal, where the channel listening includes performing channel listening based on a first listening signal in a first time domain range and performing channel listening based on a second listening signal in a second time domain range; and determining, based on a result of the channel listening, a first time-frequency resource for target detection, where a time domain resource of the first time-frequency resource is the first time domain range.

The first time domain range and the second time domain range are time domain ranges in L time domain ranges. L is a positive integer greater than 1. Any one of the L time domain ranges partially overlaps at least one of other (L−1) time domain ranges. An absolute value of a difference between time domain start locations of any two of the L time domain ranges is greater than or equal to a first threshold and less than or equal to a second threshold.

The first listening signal corresponds to a first sub-signal that is of the first signal and that is in at least one first frequency sweep period in the first time domain range, and the second listening signal corresponds to a second sub-signal that is of the second signal and that is in at least one second frequency sweep period in the second time domain range.

Optionally, the method further includes: generating the first signal and the second signal; or generating the first listening signal and the second listening signal.

The method provided in this embodiment of this application may be performed by a detection apparatus. The detection apparatus is, for example, a radar detection apparatus, or a chip or an integrated circuit in a radar detection apparatus. In this embodiment of this application, the channel listening is performed based on the first signal and the second signal, and accuracy of the determined first time-frequency resource for target detection is high. In this case, a mutual interference region of the radar detection apparatus disappears, and a false alarm or an interference platform is avoided, so that target detection accuracy of the radar detection apparatus is improved, and driving safety and user comfort are ensured to some extent.

In a possible design of the first aspect, time domain resources of the first sub-signal and the second sub-signal do not overlap.

That is, time domain resources of the first listening signal and the second listening signal do not overlap each other. In this way, after the first radar detection apparatus performs channel listening based on the first listening signal and the second listening signal, the determined first time-frequency resource for target detection may not overlap a time domain resource occupied by another radar detection apparatus, so that mutual interference between subsequent radar detection apparatuses is avoided.

In another possible design of the first aspect, the first threshold or the second threshold or both are predefined, or the first threshold or the second threshold or both are determined according to a preconfigured rule.

In this possible design, the first threshold or the second threshold or both are predefined in a first radar detection apparatus, or a configuration rule of the first threshold and/or the second threshold is preconfigured. In this way, when the first radar detection apparatus needs to perform channel listening, the first radar detection apparatus may accurately determine a time domain range corresponding to each signal, and therefore determine a time domain resource that does not overlap a time domain resource used by another radar detection apparatus. Therefore, mutual interference between radar detection apparatuses is avoided.

In still another possible design of the first aspect, a difference between start locations of any two adjacent time domain ranges in the L time domain ranges is the same.

In this embodiment, time domain start locations of the L time domain ranges are equally spaced in time domain, so that composition of a detection signal can be simplified, and implementation is easy.

Optionally, a difference between start locations of any two adjacent time domain ranges in the L time domain ranges is less than or equal to 1/L Tc. Tc is a working period of a radar detection apparatus.

Time domain start locations of any two of the L time domain ranges are staggered, so that an interference frequency mixing signal of the radar detection apparatus falls outside an intermediate frequency detection bandwidth, to reduce mutual interference between the radar detection apparatuses.

In yet another possible design of the first aspect, the method further includes:
generating a third signal, where a time domain range corresponding to the third signal is a third time domain range.

The channel listening further includes performing channel listening based on a third listening signal in the third time domain range. The third time domain range belongs to the L time domain ranges. The third time domain range is different from the first time domain range and the second time domain range. The third listening signal corresponds to a third sub-signal that is of the third signal and that is in at least one third frequency sweep period in the third time domain range.

In this embodiment, the first radar detection apparatus further generates the third signal, and the third time domain range corresponding to the third signal is a time domain range that is in the L time domain ranges and that is different from the first time domain range and the second time domain range. In this way, the first radar detection apparatus may simultaneously perform listening in frequency sweep periods in different time domain ranges, so that a time-frequency resource corresponding to the most appropriate time domain range may be determined from a relatively large quantity of time-frequency resources.

In yet another possible design of the first aspect, the performing channel listening based on a first signal and a second signal includes: performing listening in a plurality of listening regions, where an absolute value of a difference between start locations of any two of the plurality of listening regions in time domain is an integer multiple of M, and M is predefined or preconfigured.

The first radar detection apparatus performs listening in the plurality of listening regions, and an absolute value of a difference between start locations of any two listening regions in time domain may be the integer multiple of M. For example, M is a preset listening step. The listening step may be preconfigured or predefined based on a processing capability of the first radar detection apparatus. Generally, a smaller listening step indicates finer listening but longer processing time.

In yet another possible design of the first aspect, the performing channel listening based on a first signal and a second signal includes:
performing channel listening on a predefined or configured time domain resource, where the time domain resource includes at least one of the following: a refresh period of a first detection apparatus and a silent refresh period of the first detection apparatus, and the refresh period includes an idle time period and a transmission time period.

In this embodiment, the first radar detection apparatus may perform channel listening in the idle time period of the refresh period, or may perform channel listening in the transmission time period of the refresh period, or may perform channel listening in the silent refresh period. In this way, the most appropriate (most idle) time-frequency resource may be determined for subsequent target detection.

According to a second aspect, an embodiment of this application provides a signal processing apparatus. The method includes a listening unit and a determining unit.

The listening unit is configured to perform channel listening based on a first signal and a second signal. The channel listening includes performing channel listening based on a first listening signal in a first time domain range and performing channel listening based on a second listening signal in a second time domain range.

The determining unit is configured to determine, based on a result of the channel listening, a first time-frequency resource for target detection. A time domain resource of the first time-frequency resource is the first time domain range.

The first time domain range and the second time domain range are time domain ranges in L time domain ranges. L is a positive integer greater than 1. Any one of the L time domain ranges partially overlaps at least one of other (L−1) time domain ranges. An absolute value of a difference between time domain start locations of any two of the L time domain ranges is greater than or equal to a first threshold and less than or equal to a second threshold.

The first listening signal corresponds to a first sub-signal that is of the first signal and that is in at least one first frequency sweep period in the first time domain range, and the second listening signal corresponds to a second sub-signal that is of the second signal and that is in at least one second frequency sweep period in the second time domain range.

Optionally, the apparatus further includes a generation unit.

The generation unit is configured to generate the first signal and the second signal. Alternatively, the generation unit is configured to generate the first listening signal and the second listening signal.

In a possible design of the second aspect, time domain resources of the first sub-signal and the second sub-signal do not overlap.

In another possible design of the second aspect, the first threshold or the second threshold or both are predefined, or the first threshold or the second threshold or both are determined according to a preconfigured rule.

In still another possible design of the second aspect, a difference between start locations of any two adjacent time domain ranges in the L time domain ranges is the same.

Optionally, a difference between start locations of any two adjacent time domain ranges in the L time domain ranges is less than or equal to 1/L Tc. Tc is a working period of a radar detection apparatus.

In yet another possible design of the second aspect, the generation unit is further configured to generate a third signal. A time domain range corresponding to the third signal is a third time domain range.

The channel listening further includes performing channel listening based on a third listening signal in the third time domain range. The third time domain range belongs to the L time domain ranges. The third time domain range is different from the first time domain range and the second time domain range. The third listening signal corresponds to a third sub-signal that is of the third signal and that is in at least one third frequency sweep period in the third time domain range.

In yet another possible design of the second aspect, the listening unit is specifically configured to perform listening in a plurality of listening regions. An absolute value of a difference between start locations of any two of the plurality of listening regions in time domain is an integer multiple of M, and M is predefined or preconfigured.

In yet another possible design of the second aspect, the listening unit is specifically configured to perform channel listening on a predefined or configured time domain resource. The time domain resource includes at least one of the following: a refresh period of a first detection apparatus and a silent refresh period of the first detection apparatus. The refresh period includes an idle time period and a transmission time period.

For technical effects of the second aspect or the possible implementations of the second aspect, refer to the descriptions of the technical effects of the first aspect or the corresponding implementations of the first aspect.

According to a third aspect, an embodiment of this application provides a detection apparatus, including at least one processor and at least one memory. The at least one memory stores a program. When executing the program, the processor implements the method according to the first aspect and the possible designs.

According to a fourth aspect, an embodiment of this application provides another detection apparatus. The detection apparatus is, for example, the first radar detection apparatus described above. The detection apparatus includes a processor, a transmitter, and a receiver. The processor, the transmitter, and the receiver are coupled to each other, and are configured to implement the method according to the first aspect or the possible designs of the first aspect.

For example, the detection apparatus is a chip disposed in a detection device. For example, the detection device is a radar. The transmitter and the receiver are implemented, for example, through an antenna, a feeder, and a codec in a communication device. Alternatively, if the detection apparatus is the chip disposed in the detection device, the transmitter and the receiver are, for example, a communication interface in the chip. The communication interface is connected to a radio frequency transceiver component in the detection device, to implement information receiving and sending by using the radio frequency transceiver component.

According to a fifth aspect, an embodiment of this application provides still another detection apparatus. The detection apparatus may be the first radar detection apparatus in the foregoing method designs. For example, the detection apparatus is a chip disposed in a detection device. For example, the detection device is a radar. The detection apparatus includes a memory configured to store computer-executable program code and a processor coupled to the memory. The program code stored in the memory includes instructions. When the processor executes the instructions, the detection apparatus is enabled to perform the method according to any one of the first aspect or the possible implementations of the first aspect.

The detection apparatus may further include a communication interface. The communication interface may be a transceiver in the detection device, and for example, is implemented by using an antenna, a feeder, and a codec in the detection apparatus. Alternatively, if the detection apparatus is the chip disposed in the detection device, the communication interface may be an input/output interface of the chip, for example, an input/output pin.

According to a sixth aspect, an embodiment of this application provides a communication system. The communication system may include at least one of the detection apparatuses in the second aspect to the fifth aspect, or include another detection apparatus, or include a target object, or the like.

According to a seventh aspect, an embodiment of this application provides a computer-readable storage medium. The computer-readable storage medium stores a computer program. When the computer program is run on a computer, the computer is enabled to perform the method according to the first aspect and the possible designs.

According to an eighth aspect, an embodiment of this application provides a chip system. The chip system includes:

a memory, configured to store instructions; and a processor, configured to invoke the instructions from the memory and run the instructions, to enable a communication device on which the chip system is installed to perform the method according to the first aspect and the possible designs.

According to a ninth aspect, an embodiment of this application provides a computer program product. The computer program product includes a computer program. When the computer program is run on a computer, the computer is enabled to perform the method according to the first aspect and the possible designs.

According to a signal processing method and apparatus and a storage medium provided in embodiments of this application, channel listening is performed based on a first signal and a second signal. The channel listening includes performing channel listening based on a first listening signal in a first time domain range and performing channel listening based on a second listening signal in a second time domain range. Finally, based on a result of the channel listening, a first time-frequency resource for target detection is determined. A time domain resource of the first time-frequency resource is the first time domain range, so that the first signal may be sent on the first time-frequency resource. In this technical solution, the channel listening is performed based on the first signal and the second signal, and accuracy of the determined first time-frequency resource for target detection is high. In this case, a mutual interference region of a radar detection apparatus disappears, and a false alarm or an interference platform is avoided, so that target detection accuracy of the radar detection apparatus is improved, and driving safety and user comfort are ensured to some extent.

DESCRIPTION OF EMBODIMENTS

Figure 1:
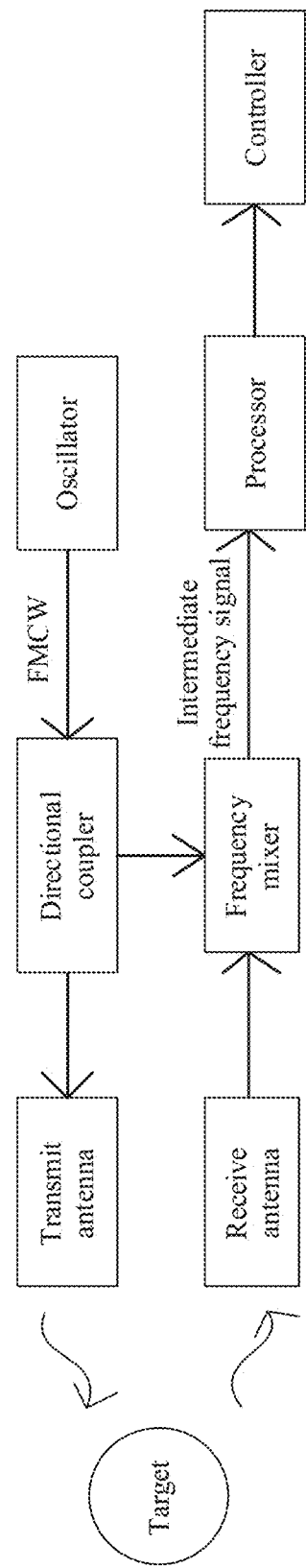
FIG. 1 is a diagram of an operating principle of a millimeter-wave radar.

To make objectives, technical solution, and advantages of embodiments of this application clearer, the following further describes embodiments of this application in detail with reference to the accompanying drawings.

The following describes some terms in embodiments of this application, to facilitate understanding of a person skilled in the art.

(1) A radar detection apparatus, for example, is a radar (radar), or may be another apparatus configured to perform detection (for example, ranging).

(2) A radar is also referred to as a radar apparatus, a detector, a radar detection apparatus, a radar signal sending apparatus, or the like. A working principle of the radar is that the radar sends a signal (or referred to as a detection signal) and receives a reflected signal reflected by a target object, to detect the corresponding target object. The signal transmitted by the radar may be a radar signal. Correspondingly, the received reflected signal reflected by the target object may also be a radar signal.

(3) A transmission period of a radar detection apparatus (or referred to as a frequency sweep period, frequency sweep time, frequency sweep duration, or the like of the radar detection apparatus) is a period in which the radar detection apparatus sends a radar signal having a complete waveform. The radar detection apparatus usually sends a radar signal in a plurality of frequency sweep periods in continuous duration.

(4) An initial frequency of a radar detection apparatus is a frequency at which the radar detection apparatus transmits a radar signal at the beginning of a transmission period. In addition, a transmission frequency of the radar detection apparatus changes in the transmission period based on the initial frequency.

(5) A frequency sweep bandwidth of a radar detection apparatus is a bandwidth occupied by a waveform of a radar signal sent by the radar detection apparatus. It should be noted herein that the "frequency sweep bandwidth" is defined for ease of description, and is technically a bandwidth occupied by the waveform of the radar signal sent by the radar detection apparatus. Further, a frequency band occupied by the waveform of the radar signal sent by the radar detection apparatus may be referred to as a frequency sweep band.

(6) A frequency modulated continuous wave (frequency modulated continuous wave, FMCW) is an electromagnetic wave whose frequency changes with time.

(7) A linear frequency modulated continuous wave is an electromagnetic wave whose frequency changes linearly with time. That the frequency changes linearly with time usually means that the frequency changes linearly with time in one transmission period. Specifically, a waveform of the linear frequency modulated continuous wave is usually a sawtooth wave or a triangular wave, or may be another waveform, for example, a stepped-frequency waveform.

(8) A maximum ranging distance of a radar detection apparatus, or a maximum detection distance of a radar detection apparatus, is a parameter related to configuration of the radar detection apparatus (for example, related to a factory setting parameter of the radar detection apparatus). For example, the radar detection apparatus is a radar. A maximum ranging distance of a long-range adaptive cruise control (adaptive cruise control, ACC) radar is 250 m, and a maximum ranging distance of a medium-range radar is 70-150 m.

(9) An intermediate frequency (intermediate frequency, IF) signal, in an example in which a radar detection apparatus is a radar, is a signal obtained after a frequency mixer performs processing on a local oscillator signal of the radar and a reflected signal (a signal obtained after a transmit signal of the radar is reflected by a target object) received by the radar. Specifically, a part of a frequency modulated continuous wave signal generated by an oscillator is used as the local oscillator signal, and another part of the frequency modulated continuous wave signal is used as a transmit signal and is transmitted by using a transmit antenna. A reflected signal of the transmit signal received by a receive antenna is mixed with the local oscillator signal, to obtain the "intermediate frequency signal". One or more pieces of location information, velocity information, or angle information of the target object may be obtained by using the intermediate frequency signal. The location information may be location information of the target object relative to a current radar. The velocity information may be velocity information of the target object relative to the current radar. The angle information may be angle information of the target object relative to the current radar. Further, a frequency of the intermediate frequency signal is referred to as an intermediate frequency.

(10) A maximum propagation delay of a radar signal is determined based on an attribute or a parameter of a current radar. The attribute or the parameter may specifically include at least one of the following: transmit power of a radar signal of a detection apparatus (a detection apparatus used as an interference source) and sensitivity of a receiver of the detection apparatus (a current detection apparatus). Specifically, another radar signal is received by the current radar after a specific propagation delay. After the propagation delay, if power of an interfering signal is greater than the sensitivity of the receiver, the interfering signal causes interference to the current radar; or if power of an interfering signal is not greater than the sensitivity of the receiver, the interfering signal does not cause interference to the current radar, and the interfering signal is processed as noise. After the propagation delay, if the power of the interfering signal is equal to the sensitivity of the receiver, the propagation delay is referred to as the maximum propagation delay of the radar signal.

(11) "At least one" means one or more, and "a plurality of" means two or more. "And/or" describes an association relationship between associated objects, and indicates that three relationships may exist. For example, A and/or B may indicate the following three cases: A exists alone, both A and B exist, and B exists alone, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one (piece) of a, b, or c may indicate: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, first information and second information are merely intended to distinguish between different information, but do not indicate that the two types of information are different in content, priorities, sending sequences, importance, or the like.

The foregoing describes some concepts in embodiments of this application. The following describes technical features in embodiments of this application.

With development of society, increasingly more machines in the modern life develop towards automation and intelligentization, and a vehicle used for mobile traveling is no exception. An intelligent vehicle is entering the daily life of people. In recent years, an advanced driving assistant system (Advanced Driving Assistant System, ADAS) plays a very important role in the intelligent vehicles. In the advanced driving assistance system, various sensors installed on a vehicle are used to sense an ambient environment, collect data, and identify, detect, and trace a still object and a moving object in a driving process of the vehicle, and a system operation and system analysis are performed based on map data of a navigator, so that a driver detects a potential danger in advance, and driving comfort and safety of the vehicle are effectively increased. In short, real unmanned driving is a product of ultimate development of the ADAS. In an unmanned driving architecture, a sensing layer is compared to "eyes" of a vehicle, and includes visual sensors such as a vehicle-mounted camera and radar sensors such as a vehicle-mounted millimeter-wave radar, a vehicle-mounted laser radar, and a vehicle-mounted ultrasonic radar. A millimeter-wave radar is the first to become a main sensor in an unmanned driving system due to cost-effectiveness and mature technologies. Currently, the ADAS has developed more than 10 functions, including adaptive cruise control, automatic emergency braking, lane change assist, blind spot detection, and the like, which are inseparable from the vehicle-mounted millimeter-wave radar.

A millimeter wave is an electromagnetic wave whose wavelength ranges from 1 mm to 10 mm, and corresponds to a frequency range from 30 GHz to 300 GHz. In this frequency band, features related to the millimeter wave makes the millimeter wave radar very suitable for the vehicle-mounted field. A high bandwidth means abundant frequency domain resources and a low antenna side lobe, and facilitates imaging or quasi-imaging. A small wavelength means that a size of a radar device and an antenna diameter are reduced, and therefore a weight is reduced. A narrow beam means that a millimeter-wave beam is much narrower than a micrometer-wave beam a same antenna size, and therefore there is high radar resolution. Strong penetration means that compared with laser radar and an optical system, millimeter-wave radar has a better capability of penetrating smoke, dust, and fog, and may work around the clock.

A vehicle-mounted millimeter-wave radar system generally includes apparatuses such as an oscillator, a transmit antenna, a receive antenna, a frequency mixer, a processor, and a controller. FIG. 1 is a diagram of an operating principle of a millimeter-wave radar. As shown in FIG. 1, the oscillator generates a radar signal whose frequency increases linearly over time. The radar signal usually has a frequency modulated continuous wave. A part of the radar signal is output to the frequency mixer by using a directional coupler and is used as a local oscillator signal, and another part of the radar signal is transmitted through the transmit antenna. The receive antenna receives a radar signal reflected after a transmitted radar signal encounters an object in front of a vehicle. The frequency mixer mixes the received radar signal and the local oscillator signal, to obtain an intermediate frequency signal. The intermediate frequency signal includes information such as a range, a velocity, and an angle of a target object relative to the radar system. The intermediate frequency signal that passes through a low-pass filter and that has undergone amplification processing is transmitted to the processor. The processor usually performs fast Fourier transform, spectrum analysis, and the like on the receive signal, to obtain the distance, the velocity and the angle between the target object and the radar system. Finally, the processor may output the obtained information to the controller, to control behavior of the vehicle.

A waveform of the frequency modulated continuous wave of the millimeter-wave radar is generally a sawtooth wave or a triangular wave. The following uses the sawtooth wave as an example to describe in detail a ranging principle of the millimeter-wave radar. A ranging principle of the triangular wave is similar to that of the sawtooth wave.

Figure 2:
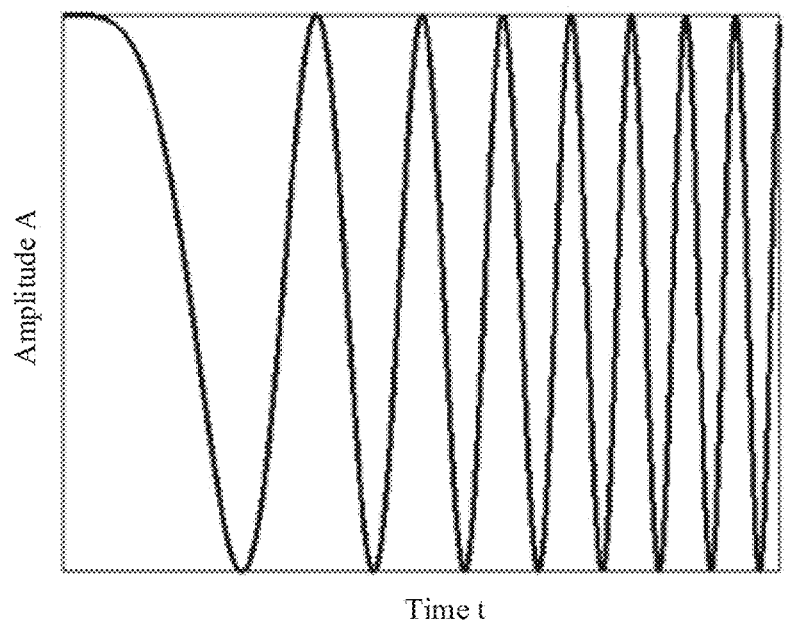
FIG. 2 is a time-amplitude diagram of a frequency modulated continuous wave in a single period.
Figure 3:
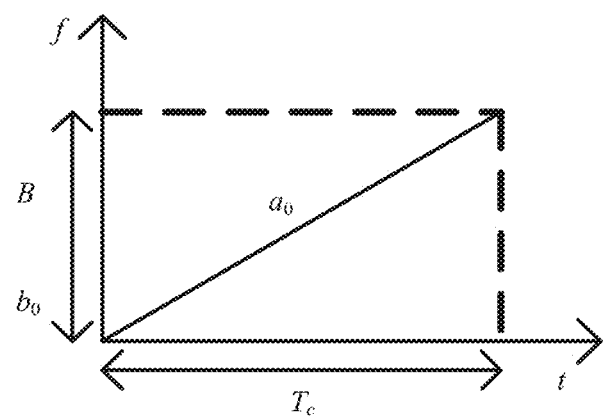
FIG. 3 is a time-frequency diagram of a frequency modulated continuous wave in a plurality of periods.

FIG. 2 is a time-amplitude diagram of the frequency modulated continuous wave in a single period, and FIG. 3 is a time-amplitude diagram of the frequency modulated continuous wave in a plurality of periods. As shown in FIG. 2, the linear frequency modulated continuous wave is a signal whose frequency changes linearly with time. As shown in FIG. 3, a period of the frequency modulated continuous wave is $T_c$, a slope is $a_0$, a bandwidth is B, and start frequency is $b_0$. A frequency modulated continuous wave signal shown in FIG. 2 is also referred to as a chirp (chirp) signal.

An equivalent baseband signal of the frequency modulated continuous wave in a single period that is output by the oscillator of the millimeter-wave radar may be expressed as follows:

$$s_{BB,n}^T(t) = A \exp\left\{ j2\pi\left[\frac{a_0}{2}(t-nT_c)^2 + b_0 t + \varphi_0\right]\right\} \quad \text{(formula 1.1)}$$

-continued $$nT_c \le t < (n+1)T_c, n = 0, 1, 2, \ldots, N-1$$

In the formula, A indicates an amplitude of the equivalent baseband signal, $a_0$ indicates a slope of the equivalent baseband signal, $b_0$ indicates an intercept of the equivalent baseband signal on a Y axis, $\varphi_0$ indicates an initial phase of the equivalent baseband signal, exp indicates an exponential function of e, and N indicates a quantity of periods for continuously sending the frequency modulated continuous wave. Because a frequency is defined as a change rate of a phase relative to time, a frequency of the equivalent baseband signal is as follows:

$$f = \frac{d\left(\frac{a_0}{2}(t-nT_c)^2 + b_0 t + \varphi_0\right)}{dt} = a_0(t-nT_c) + b_0 \quad \text{(formula 1.2)}$$

$$nT_c \le t < (n+1)T_c, \; n = 0, 1, 2, \ldots, N-1$$

An image of the formula 1.2 is shown in FIG. 3.

Figure 4:
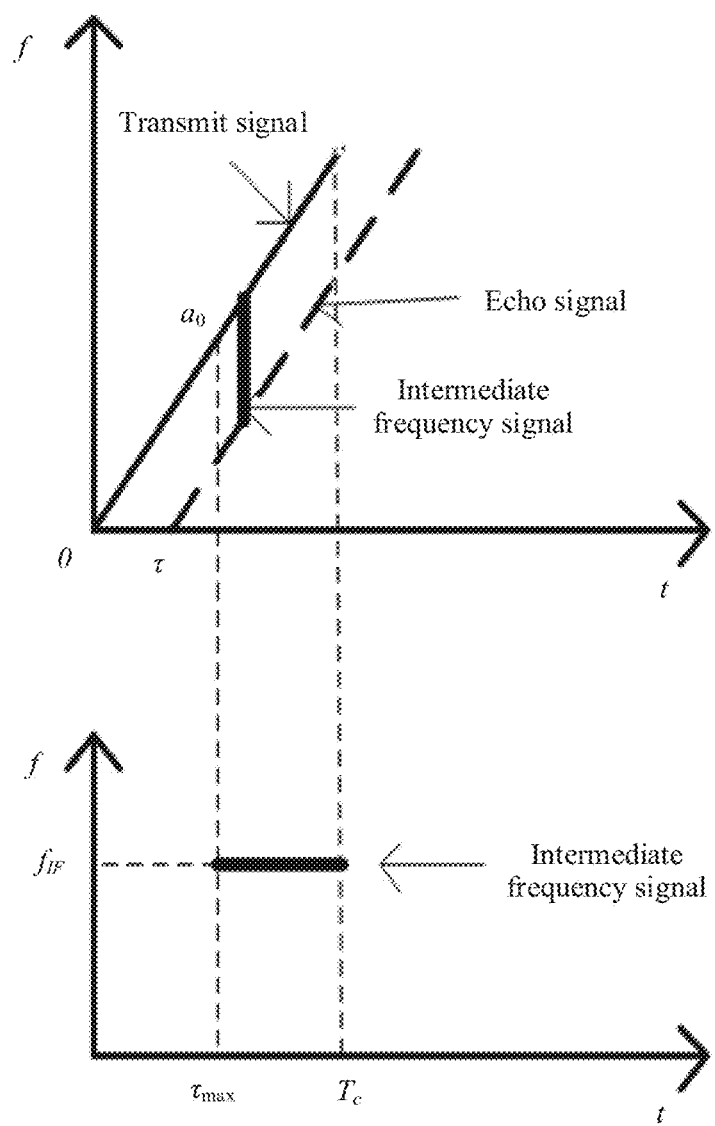
FIG. 4 is a schematic diagram of a relationship between a transmit signal, a receive signal, and an intermediate frequency signal.

For example, FIG. 4 is a schematic diagram of a relationship between a transmit signal, a receive signal, and an intermediate frequency signal. After up-conversion, the equivalent baseband signal of the frequency modulated continuous wave sent by the oscillator in an $n^{th}$ period is radiated outward by the transmit antenna of the millimeter-wave radar. The transmit signal may be expressed as follows:

$$S^T_{RF,n}(t) = s^T_{BB,n}(t) \exp(j2\pi f_c t) \quad \text{(formula 1.3)}$$

$$= A \exp\left\{j2\pi\left[\frac{a_0}{2}(t-nT_c)^2 + \varphi_0\right]\right\} \exp(j2\pi(f_c + b_0)t)$$

$$nT_c \le t < (n+1)T_c, n = 0, 1, 2, \ldots, N-1$$

In the formula, $f_c$ is a carrier frequency. After the signal encounters an obstacle, the signal is reflected back and received by the millimeter-wave radar. A waveform of the transmit signal is the same as that of a reflected signal, except that the waveform of the reflected signal has a delay $\tau$ relative to the waveform of the transmit signal. Refer to FIG. 4. In FIG. 4, an echo signal is the reflected signal. Therefore, the receive signal of the frequency modulated continuous wave in the $n^{th}$ period may be expressed as:

$$S^R_{RF}(t-\tau) = \quad \text{(formula 1.4)}$$

$$A' \exp\left\{j2\pi\left[\frac{a_0}{2}(t-nT_c-\tau)^2 + (b_0 + f_c)(t-nT_c-\tau) + \varphi_0\right]\right\}$$

$$\tau + nT_c \le t < \tau + (n+1)T_c, \; n = 0, 1, 2, \ldots, N-1$$

In the formula, A' is an amplitude of a signal obtained after the equivalent baseband signal sent by the oscillator undergoes gain of the transmit antenna, reflection by a target, propagation loss, and gain of the receive antenna, and $\tau$ is a total delay from transmission of a radar signal by a transmitter of the millimeter-wave radar to receiving of the echo signal (namely, the reflected signal) by a receiver of the millimeter-wave radar. As shown in FIG. 4, the delay is twice as large as a distance/speed of light. In addition, in FIG. 4, $\tau_{max}$ indicates an echo delay corresponding to a maximum detection distance of the millimeter-wave radar. In other words, $\tau_{max}$ is a delay of the reflected signal received by the millimeter-wave radar relative to the transmit signal when a distance between the millimeter-wave radar and the target object is a maximum distance that the millimeter-wave radar can detect.

$$\tau = \tau_0 + \frac{2vt}{c} \quad \text{(formula 1.5)}$$

In the formula, $\tau_0$ is a radar echo delay caused by a reference distance, $v$ is a radial relative velocity between the target and the radar, and c is a speed of light. The velocity $v$ is far less than the speed c of light. For a baseband signal, in subsequent detection, the second term in the foregoing formula makes little contribution, and in this case, the second term in the formula (1.5) is ignored in the baseband signal. However, in a carrier frequency, the second term in the foregoing formula (1.5) plays a key role in velocity detection, and therefore the item is reserved. Therefore, a signal obtained after down-conversion is performed on the received equivalent baseband signal is:

$$S^R_{RF,n}(t) \approx \quad \text{(formula 1.6)}$$

$$A' \exp\left\{j2\pi\left[\frac{a_0}{2}(t-nT_c-\tau_0)^2 + (b_0 + f_c)(t-nT_c-\tau) + \varphi_0\right]\right\}$$

$$\tau + nT_c \le t < \tau + (n+1)T_c, \; n = 0, 1, 2, \ldots, N-1$$

The frequency mixer of the millimeter-wave radar performs frequency mixing on the receive signal and the transmit signal, and a signal obtained after frequency mixing passes through an intermediate frequency filter, to output an intermediate frequency signal. The intermediate frequency signal is represented as:

$$S^R_{IF,n}(t) = \frac{1}{A} S^T_{RF,n}(t) \times \left[S^R_{RF,n}(t)\right]^* \quad \text{(formula 1.7)}$$

$$\xrightarrow{u=t-nT_c} S^R_{IF,n}(u) = A' \times \exp(j\Phi_n) \times \exp\left[j2\pi\left[(a_0\tau_0 + f_d^0)u\right]\right], \tau \le u < T_c$$

In the formula, $$\Phi_n = 2\pi\left[(b_0 + f_c)\tau_0 - \frac{a_0}{2}\tau_0^2 + f_d^0 nT_c\right], f_d^0 = (b_0 + f_c)\frac{2v}{c},$$

and $f_d^0$ are Doppler frequencies formed by radial relative velocities of the target and a detection radar.

The intermediate frequency signal is sent to the processor of the millimeter-wave radar for processing such as fast Fourier transform, to obtain a frequency $f_{IF}$ of the intermediate frequency signal.

In addition, as shown in FIG. 4, the frequency of the intermediate frequency signal is a product of a waveform slope of the transmit signal and the delay $\tau$, that is, $$f_{IF} = a_0 \cdot \tau = \frac{B}{T_c} \cdot \frac{2d}{c} = \frac{2d}{c \cdot T_c} B \quad \text{(formula 1.8)}$$

Therefore, the distance d between the millimeter-wave radar and the target object is:

$$d = \frac{c \cdot T_c}{2B} f_{IF} \quad \text{(formula 1.9)}$$

It can be learned from the deduction process that there is a linear relationship between a delay and a frequency difference (namely, the frequency of the intermediate frequency signal) between the transmit signal and the receive signal: A larger distance between the millimeter-wave radar and the target object indicates later time at which the millimeter-wave radar receives the reflected signal, and therefore indicates a larger frequency difference between the reflected signal and the transmit signal. Therefore, the frequency of the intermediate frequency signal may be determined, to determine the distance between the radar and the target object. In addition, the foregoing process of processing the radar signal is merely an example, and a specific radar processing process is not limited.

For velocity detection, it can be learned from the formula (1.7) that a phase difference between echo intermediate frequency signals in two adjacent periods at a same sampling time point is a fixed value, and $\Delta\Phi = \Phi_{n+1} - \Phi_n = 2\pi f_d^0 T_c$. A Doppler frequency $f_d$ may be obtained by performing Fourier transform on phase sequences of echo intermediate frequency signals in a plurality of consecutive periods at a same time sampling point. A relationship between the Doppler frequency and the radial relative velocity v of the target may be expressed as $$f_d^0 = (b_0 + f_c)\frac{2v}{c} = \frac{2v}{\lambda},$$

where $\lambda$ is a signal wavelength of the radar.

Therefore, the radial relative velocity between the radar and the target is $$v = \frac{\lambda f_d^0}{2}.$$

As a penetration rate of the radar (for example, a vehicle-mounted unit and/or a roadside unit) increases, mutual interference between radars becomes increasingly severe. Therefore, a probability of radar detection is greatly reduced or a false alarm probability of radar detection is increased, which causes non-negligible impact on driving safety or comfort.

Figure 5:
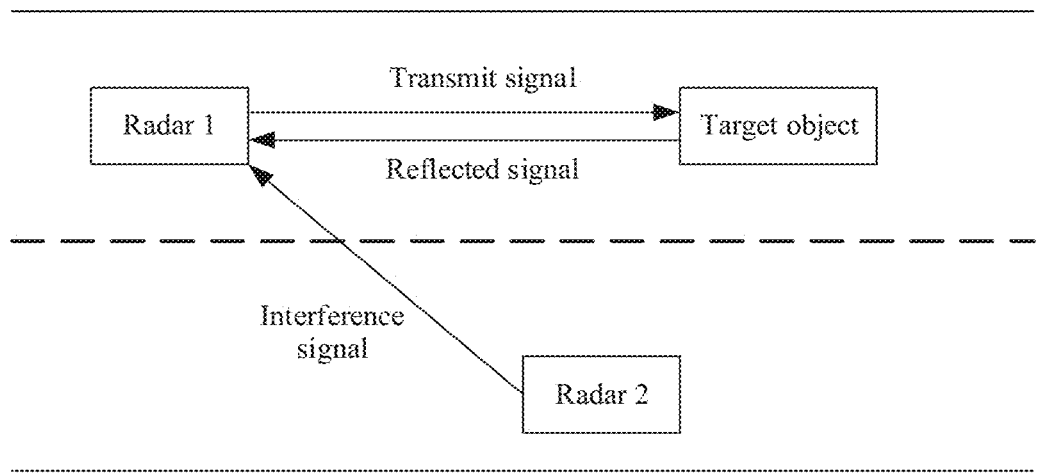
FIG. 5 is a schematic diagram of mutual interference between vehicle-mounted radars.

FIG. 5 is a schematic diagram of mutual interference between vehicle-mounted radars. Refer to FIG. 5. A radar 1 sends the transmit signal, and receives the reflected signal that is reflected back from the transmit signal on the target object. When the radar 1 receives the reflected signal, a receive antenna of the radar 1 also receives a transmit signal or a reflected signal of a radar 2. In this case, the transmit signal of the radar 2 or the reflected signal of the radar 2 that is received by the radar 1 is an interference signal for the radar 1.

For example, if the radar 1 is an observation radar, a slope of a frequency modulated continuous wave of the radar 1 is $a_0$, an intercept is $b_0$, and a period is $T_c$. If the radar 2 is an interference radar, a slope of a frequency modulated continuous wave of the radar 2 is $a_1$, and an intercept is $b_1$. In this case, it is assumed that $b_0$ is equal to $b_1$. An echo delay corresponding to a maximum ranging distance of the radar 1 is $\tau_{max}$ (that is, a delay calculated by substituting the maximum detection distance of the radar into formula 1.6. For example, if the maximum detection distance of the radar is 250 m, the delay calculated by using formula 1.6 is 1.67 μs). A delay of the interference signal of the radar 2 that arrives at a receiver of the radar 1 is $\tau_1$. It is considered that there is a timing error $\Delta\tau$ (for example, an error at the transmit moment, for example, 60 ns, due to a timing error of a global positioning system (global positioning system, GPS)) at a transmit moment of the radar. A time interval for the radar to detect the received signal is $\tau_{max} \sim T_c$.

Figure 6:
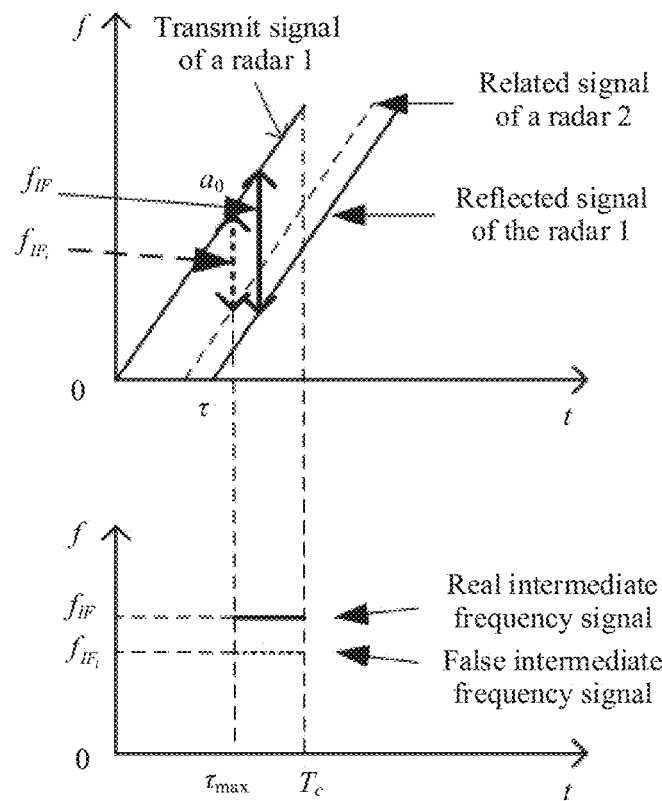
FIG. 6 and FIG. 7 are schematic diagrams of a possible false intermediate frequency signal.
Figure 7:
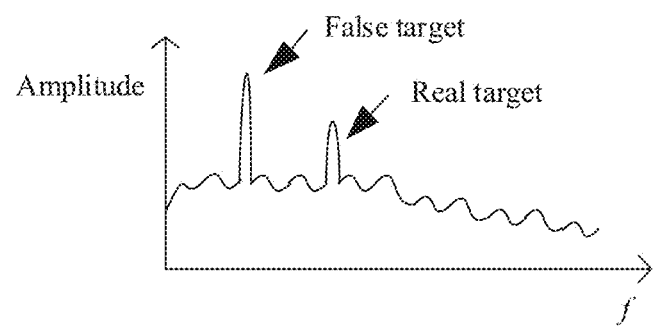

FIG. 6 and FIG. 7 are schematic diagrams of a possible false intermediate frequency signal. If a slope of a radar signal sent by the radar 1 is the same as that of a radar signal sent by the radar 2, that is, $a_0 = a_1$, and operating frequency bands of the two radar signals overlap, a false alarm is generated.

In this case, the intermediate frequency signals generated at the receivers of the radars are as follows:

$$S_{IF,n}^{R,i}(u) = A_i' \times \exp(j\Phi_n^i) \times \exp[j2\pi[(a_0\tau_i + f_d^i)u], \quad \tau_i \leq u < T_c \quad \text{(formula 1.10)}$$

In the formula, $$\Phi_n^i = 2\pi\left[f_c\tau_i - \frac{a_0}{2}\tau_i^2 + b_0\tau_i + \varphi_0 - \varphi_i + f_d^i nT_c\right].$$

$A_i'$ is an amplitude of a signal obtained after a signal of the interference radar undergoes gain of the transmit antenna, reflection by the target, propagation loss, and gain of the receive antenna, $\varphi_i$ is an initial phase of the signal of the interference radar, $f_d^i$ is a Doppler frequency formed by the signal of the interference radar due to the radial relative velocity between the target and the detection radar, and $\tau_i$ is a delay from transmission of the signal of the interference radar by a transmitter to receiving of the signal by a receiver of the interfered radar.

As shown in FIG. 6, the radar 1 transmits the signal to the target object, and receives the reflected signal from the target object. However, within a time range between transmitting the signal and receiving the reflected signal by the radar 1, the receive antenna of the radar 1 receives the transmit signal or the reflected signal (shown in the dashed line) of the radar 2. A signal waveform of the radar 1 is consistent with that of the radar 2, and frequency sweep bandwidths of the radar 1 and the radar 2 are the same. In a target echo observation range of the radar 1, if the radar 1 receives a signal shown by a dashed line of corresponding frequency, the radar 1 considers that there is a "target object 1". If the radar 1 detects, in the time interval ($\tau_{max} \sim T_c$) for signal processing, the signal shown by the dashed line and a reflected signal shown by a solid line, the radar 1 mistakenly considers that the received signal shown by the dashed line is a reflected signal from an object ahead, and in this case, a false intermediate frequency signal is generated. After fast Fourier transform is performed, spectrum analysis is performed on the radar 1, and two peak values may be found. As shown in FIG. 7, each peak value corresponds to one target object, and the radar 1 considers that both the "target object 1" and a "target object 2" exist. The radar 1 mistakenly considers that the "target object 1" exists in front, but the "target object 1" does not exist actually. This is referred to as a "ghost" or a "false alarm". After the false alarm occurs, an autonomous vehicle slows down or brakes suddenly when there is no object in front. Consequently, driving comfort is reduced.

Figure 8:
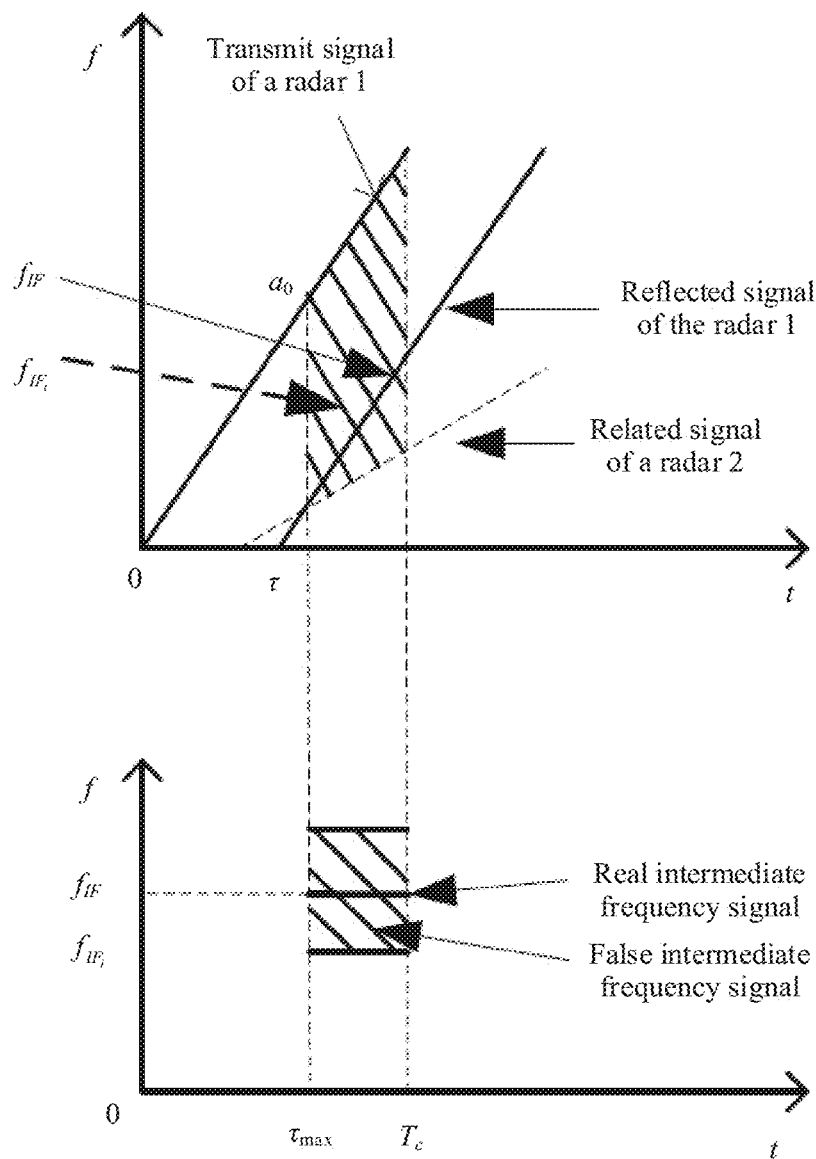
FIG. 8 and FIG. 9 are schematic diagrams in which a possible interference signal overwhelms a target signal.
Figure 9:
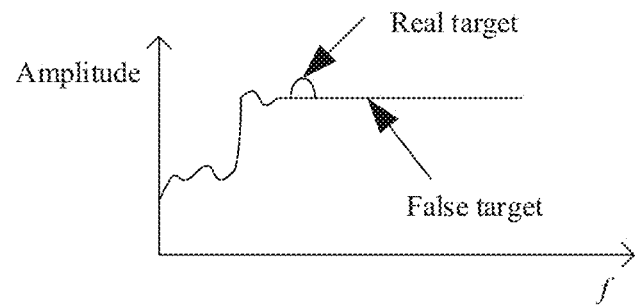

FIG. 8 and FIG. 9 are schematic diagrams in which a possible interference signal overwhelms a target signal. As shown in FIG. 8, the radar 1 transmits the signal to the target object, and receives the reflected signal from the target object. However, in the target echo observation range of the radar 1, the receive antenna of the radar 1 receives the transmit signal or the reflected signal (a dashed line) of the radar 2. A slope of the signal waveform of the radar 1 is different from that of the signal waveform of the radar 2. In the signal detection time interval $(\tau_{max} \sim T_c)$, (the radar 1 detects the reflected signals of the radar 1 and related signals of the radar 2. After frequency mixing of the detected related signals of the radar 2 and the reflected signals of the radar 1, an intermediate frequency signal including various frequency components is generated. Details are as follows:

$$S_{IF,n}^{R,i}(u) = A_i' \times \exp(j\Phi_n^i) \times$$
$$\exp\left[j2\pi\left[\left(\frac{a_0 - a_i}{2}\right)u^2 + (a_i\tau_i + f_d^i)u\right], \tau_i \le u < T_c\right.$$

(formula 1.11)

In the formula, $$\Phi_n^i = 2\pi\left[f_c\tau_i - \frac{a_i}{2}\tau_i^2 + b_0\tau_i + \varphi_0 - \varphi_i + f_d^i nT_c\right].$$

As shown in FIG. 9, after fast Fourier transform is performed on the intermediate frequency signal, an interference platform appears, making a "protruding" degree of a true target object insufficient. This makes detection difficult and increases a possibility of missing detection. After missing detection occurs, when there is an object in front of the autonomous vehicle, the autonomous vehicle mistakenly considers that there is no object, and does not decelerate or brake. Consequently, a traffic accident is caused, and vehicle driving safety is reduced.

Figure 10:
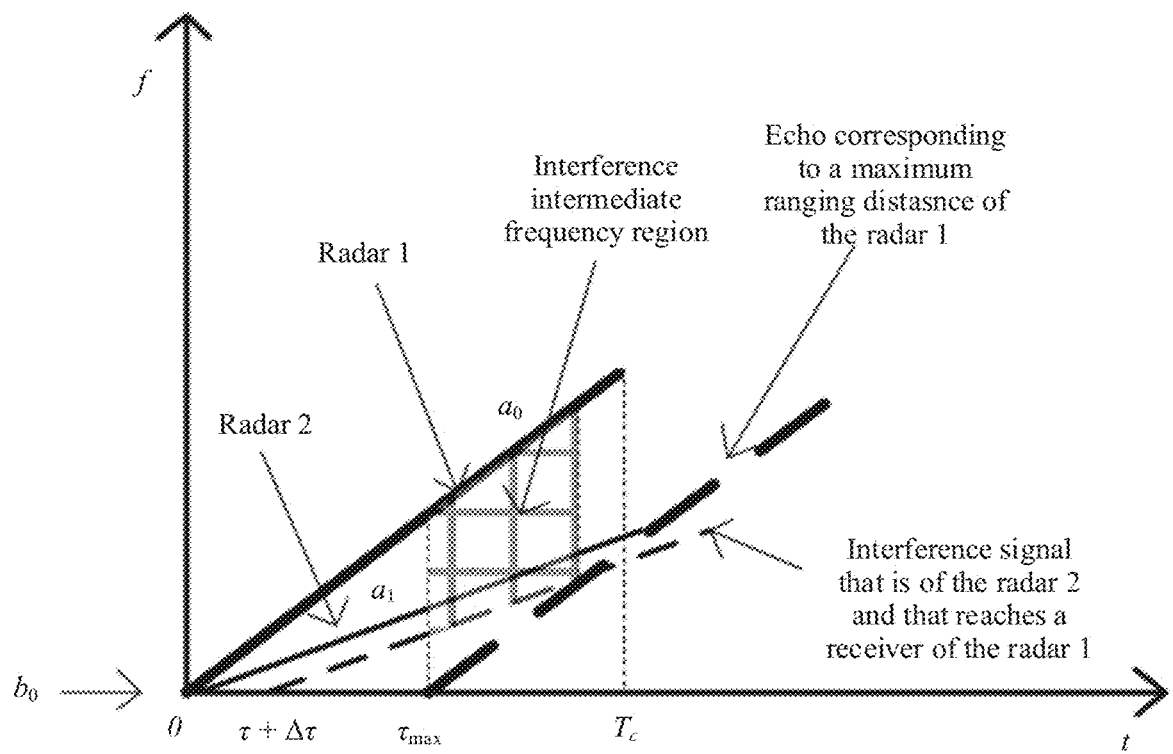
FIG. 10 and FIG. 11 are schematic diagrams of an interference platform of a radar.
Figure 11:
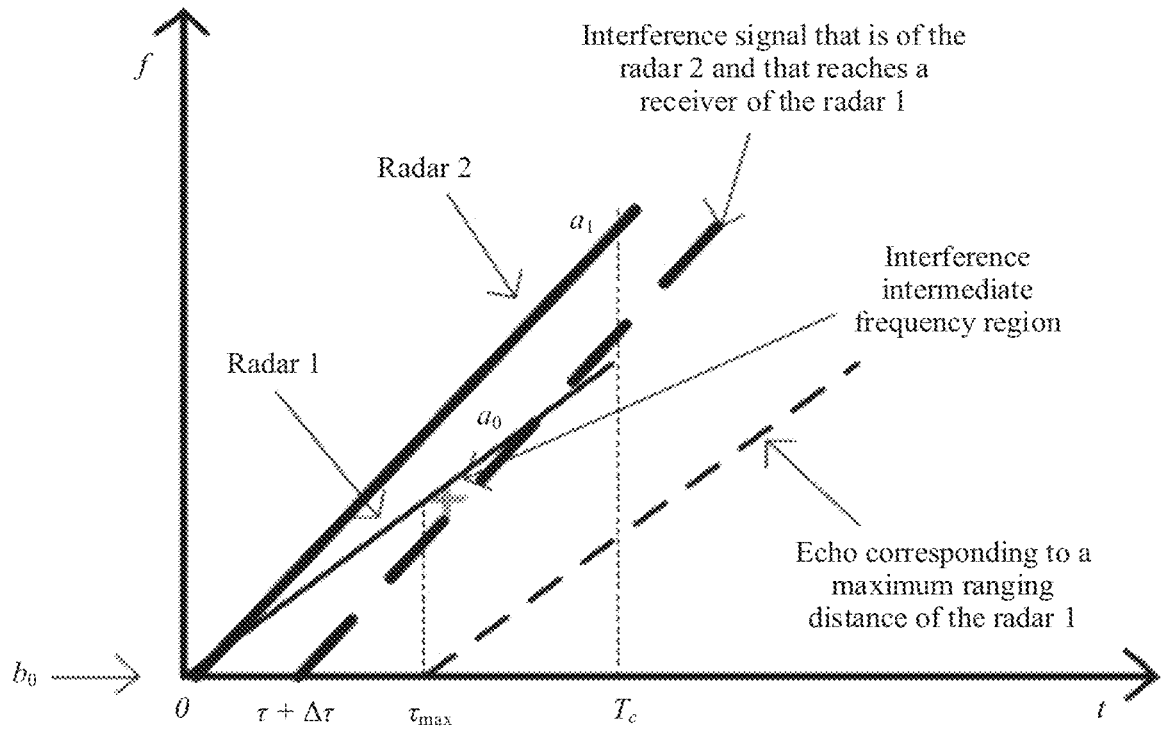

FIG. 10 and FIG. 11 are schematic diagrams of the interference platform of the radar. Specifically, a slope of the signal waveform of the radar 1 is different from that of the signal waveform of the radar 2. If a waveform slope of the radar 1 is $\alpha_0$, and a waveform slope of the radar 2 is $\alpha_1$, a difference between the two slopes may be classified into the following two cases:

When $\alpha_1 < \alpha_0$, as shown in FIG. 10, the interference platform appears, resulting in a missing detection issue.

When $\alpha_1 > \alpha_0$, as shown in FIG. 11, the interference platform also appears, resulting in a missing detection issue.

It should be noted that, a person skilled in the art may understand that a signal received at a moment or in a period of time may be an interference signal, or may be a reflected signal of a target object. A radar detection status can be clearly indicated by changes in time and a frequency of a transmitted/reflected signal. Therefore, in subsequent descriptions of embodiments of this application, a curve chart indicating a slope (a frequency range within a specific period of time) of the transmitted/reflected signal is mostly used to indicate mutual interference between radars.

However, if the probability of radar detection is reduced or the false alarm probability of radar detection is increased, impact on driving safety or comfort is non-negligible. Therefore, how to reduce interference between the radars needs to be resolved.

To resolve the foregoing problem, in one possible solution, the radar uses a random pause time length, to randomize transmission time of the radar, so that periodic interference to another radar is avoided. Although the transmission time may be randomized to reduce a possibility of periodic interference, interference between the radars cannot be eliminated. When interference is received by the receiver of the radar, measurement of the target is affected regardless of whether the interference is periodic.

In another possible solution, parameters such as different waveform slopes and periods may be set for different radars.

Figure 12:
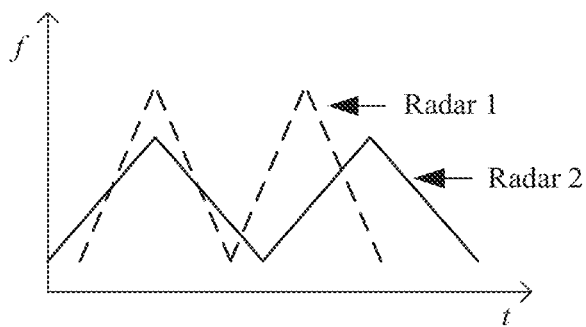
FIG. 12 is a schematic diagram of a possible solution.
Figure 13:
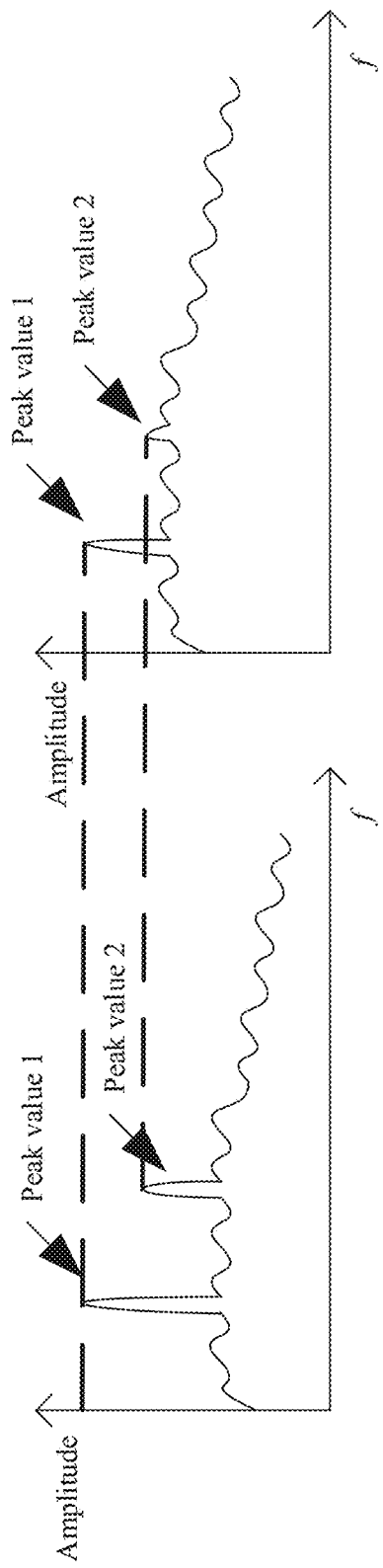
FIG. 13 is a schematic diagram of a possible missing detection result.

FIG. 12 is a schematic diagram of a possible solution. As shown in FIG. 12, parameters such as a waveform slope and a transmit period of a signal of the radar 1 are inconsistent with those of a signal of the radar 2. In this way, even if the radar 1 receives the signal of the radar 2, because the waveforms of the signals of the radar 1 and the radar 2 are inconsistent, an intermediate frequency signal with a constant frequency is not generated when the signals pass through the frequency mixer, that is, when there is a difference between the frequencies. Only the intermediate frequency signal with a constant frequency is reflected as a peak signal in spectrum analysis. Therefore, according to this method, a ghost probability can be reduced. However, if the radar 1 receives the signal of the radar 2, and after the signal passes through the frequency mixer, an interference signal falls within an effective receive intermediate frequency bandwidth, strength of the interference signal is increased. After a level of the interference signal is increased, an original target signal is overwhelmed due to interference, as shown in FIG. 13. FIG. 13 is a schematic diagram of a possible missing detection result. Consequently, an obstacle ahead of a vehicle is not detected, and therefore missing detection occurs. This has adverse impact on driving safety of the vehicle, particularly on safety of an autonomous vehicle.

Figure 14:
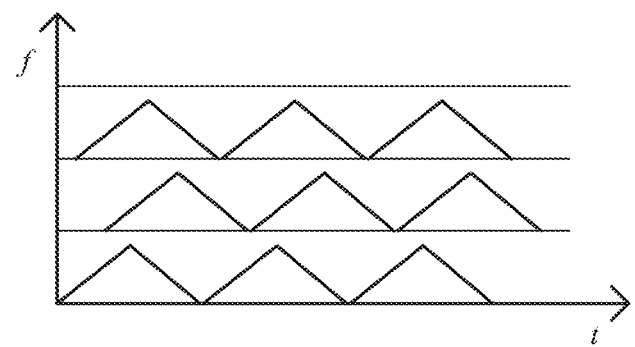
FIG. 14 is a schematic diagram of another possible solution.
Figure 15:
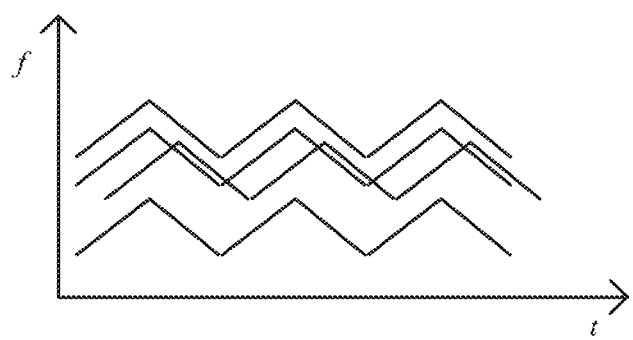
FIG. 15 is a schematic diagram of still another possible solution.

FIG. 14 is a schematic diagram of another possible solution. The technology used in this solution is a radar waveform frequency shift (shift) technology. If a radar detects interference from another radar in a frequency sweep band, the radar shifts to another frequency band, to prevent interference between a plurality of radars. In the frequency shift (shift) technology, a frequency shift (shift) interval may be greater than a frequency sweep bandwidth of the radar. In this case, radar waveforms are completely frequency-divided without overlapping, as shown in FIG. 14. Currently, frequency domain resources allocated to the radar are limited. However, due to setting of the frequency shift (shift) interval, excessive frequency domain resources are occupied. Alternatively, the frequency shift (shift) technology is still used, but after detecting interference from another radar in an operating frequency band of the radar, the radar performs a random frequency shift (shift), as shown in FIG. 15. FIG. 15 is a schematic diagram of still another possible solution. In this case, interference can be reduced to some extent. However, a completely randomized frequency shift may inevitably cause waveforms of the two radars to be too close in frequency domain after the frequency shift. Consequently, the ghost occurs or the strength of the interference signal is increased, causing an object to be not detected.

In view of this, an embodiment of this application provides a signal processing method. In this embodiment of this application, channel listening is performed based on a first signal and a second signal. The channel listening includes performing channel listening based on a first listening signal in a first time domain range and performing channel listening based on a second listening signal in a second time domain range. Based on a result of the channel listening, a first time-frequency resource for target detection is determined. A time domain resource of the first time-frequency resource is the first time domain range. In other words, in this embodiment of this application, efficient listening of a radar orthogonal time-domain waveform may be implemented based on the first signal and the second signal, and implementation of the first signal and the second signal is simple, so that a radar detection apparatus can still perform coordination without synchronization information. The radar detection apparatus selects an appropriate time-frequency resource based on a listening result to work, so that a radar signal sent by one radar detection apparatus does not fall within a target echo observation range of another radar detection apparatus, and a radar signal sent by the another radar detection apparatus does not fall within a target echo observation range of a first radar detection apparatus. Therefore, interference between radar detection apparatuses is avoided.

Figure 16:
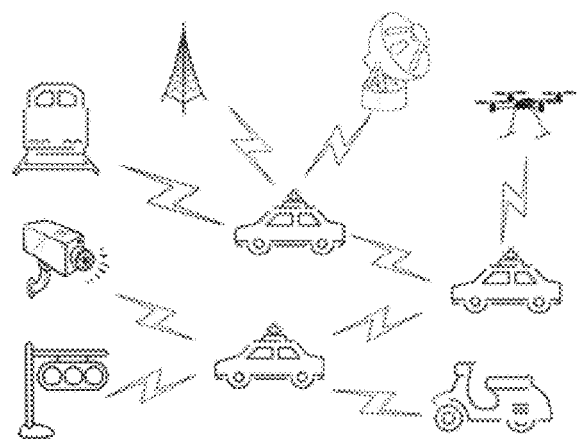
FIG. 16 is a schematic diagram of a possible application scenario according to an embodiment of this application.

FIG. 16 is a schematic diagram of a possible application scenario according to this embodiment of this application. As shown in FIG. 16, the application scenario may be unmanned driving, autonomous driving, intelligent driving, connected driving, or the like. The radar detection apparatus may be installed on a motor vehicle (for example, an unmanned vehicle, an intelligent vehicle, an electric vehicle, or a digital vehicle), an unmanned aerial vehicle, a railcar, a bicycle, a signal light, a speed measurement apparatus or a network device (for example, a base station or a terminal device in various systems), or the like. This embodiment of this application is applicable not only to a radar detection apparatus for vehicles, but also to a radar detection apparatus for another apparatus such as a vehicle and an unmanned aerial vehicle, or a radar detection apparatus for other apparatuses. In addition, the radar detection apparatus may be installed on a mobile device, for example, installed on a vehicle as a vehicle-mounted radar detection apparatus, or may be installed on a fixed device, for example, installed on a device such as a road side unit (road side unit, RSU). An installation location, a function, and the like of the radar detection apparatus are not limited in this embodiment of this application.

This embodiment of this application may be performed by a detection apparatus. For example, a detection apparatus that performs the method provided in this embodiment of this application may be referred to as a first detection apparatus. For ease of description, in this embodiment of this application, the following mostly explains and describes this embodiment by using an example in which the detection apparatus is the radar detection apparatus and the radar detection apparatus is a radar such as a millimeter-wave radar. However, in this embodiment of this application, the detection apparatus is not limited to only the radar detection apparatus, and the radar detection apparatus is not limited to only the millimeter-wave radar or the radar. Further, in this embodiment of this application, a plurality of radar detection apparatuses sending radar signals in corresponding time domain ranges in L time domain ranges may have a same frequency sweep period. For example, if a radar detection apparatus 1 sends a radar signal in a first time domain range in the plurality of time domain ranges, and a radar detection apparatus 2 sends a radar signal in a second time domain range in the plurality of time domain ranges, a frequency sweep period of the radar detection apparatus 1 is the same as a frequency sweep period of the radar detection apparatus 2.

In addition, a signal sent by the detection apparatus may be a radio signal. If that the detection apparatus is the radar detection apparatus is used as an example, it may be considered that the signal sent by the detection apparatus is a radar signal. In this embodiment of this application, that the detection apparatus is the radar detection apparatus, and the signal sent by the detection apparatus is the radar signal is used as an example.

It should be noted that, in the L time domain ranges, the plurality of radar detection apparatuses transmit radar signals in corresponding time domain ranges. The time domain range may be continuous duration. The radar detection apparatus may send a radio signal in one or more frequency sweep periods in the continuous duration. In addition, the time domain range may also be referred to as a time domain unit, a time domain resource, a time unit, a time resource, duration, or the like. A specific name is not limited. A length of one time domain range may be equal to a transmission period (also referred to as a frequency sweep period, frequency sweep duration, or the like) of the radar detection apparatus. In other words, a time domain length of each of the L time domain ranges may be the frequency sweep period of the radar detection apparatus. Alternatively, a length of one time domain range may be equal to an integer multiple of the frequency sweep period of the radar detection apparatus. For example, if duration of a time domain range is 500 frequency sweep periods, a corresponding radar detection apparatus needs to transmit a radar signal of 500 frequency sweep periods in this time domain range. In some scenarios, time domain lengths of the L time domain ranges are the same. In some other scenarios, time domain lengths of the L time domain ranges may be not all the same.

In addition, it should be noted that in a possible case, the radar detection apparatus transmits the radar signal at specific transmission timing. However, due to a possible difference in an actual communication scenario, an environment, or a hardware device, an actual transmission moment of the radar signal may have an error, which may also be referred to as a signal transmission error, for example, an error caused by GPS precision. In another possible case, in a manufacturing process, different radar detection apparatuses may have slight errors in signal transmission due to differences in manufacturing. In another case, there may also be an error caused by another reason. All the foregoing possible errors may be considered in the method provided in this embodiment of this application in specific implementation. Alternatively, in this embodiment of this application, these errors may be ignored, and the solutions are described based on a uniform standard and uniform transmission timing. It should be noted that when the technical solutions are described in this embodiment of this application, implementation and advantageous effects of this embodiment of this application are not substantially affected regardless of whether the errors are considered or ignored.

The technical solutions provided in this embodiment of this application are described below in detail with reference to the accompanying drawings.

Figure 17:
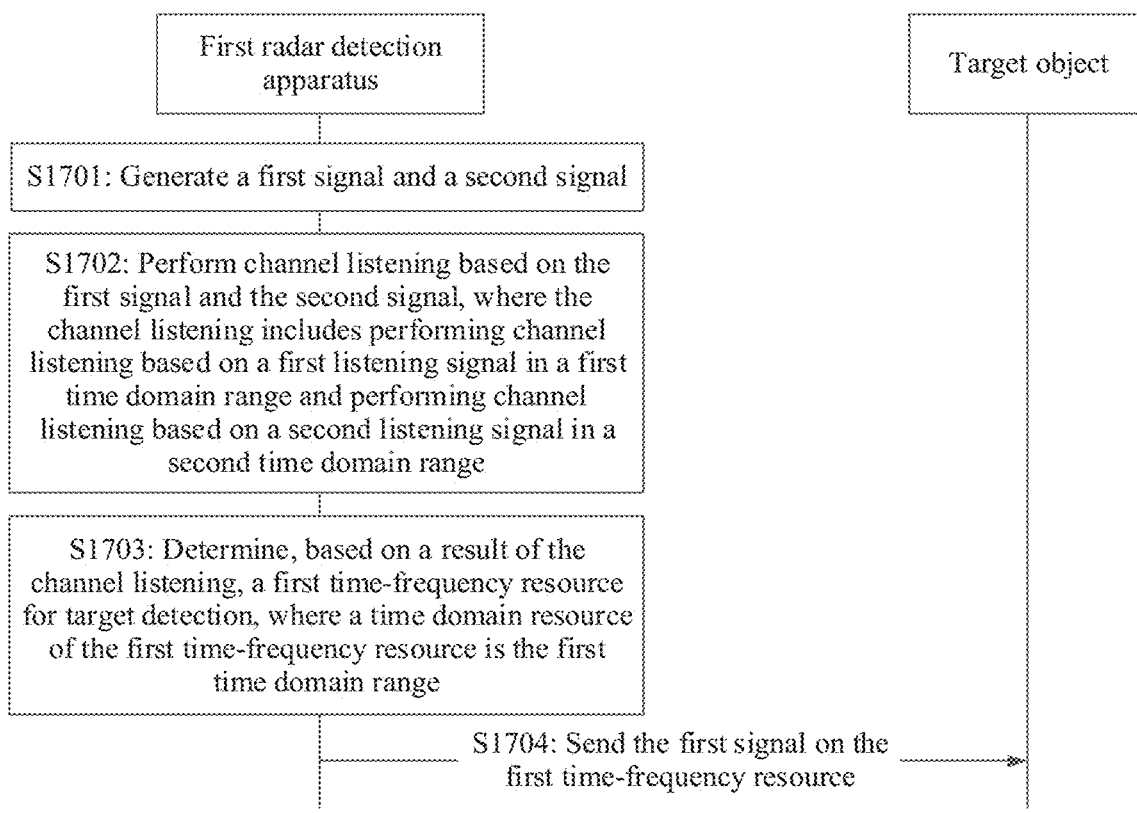
FIG. 17 is a schematic flowchart of Embodiment 1 of a signal processing method according to an embodiment of this application.

FIG. 17 is a schematic flowchart of Embodiment 1 of a signal processing method according to this embodiment of this application. In the following description process, an example in which the method is applied to the network architecture shown in FIG. 16 is used. The method provided in this embodiment shown in FIG. 17 may be performed by a radar detection apparatus in the network architecture shown in FIG. 16. For example, the radar detection apparatus is referred to as the first radar detection apparatus. In addition, in the following description, a signal sent by the radar detection apparatus may the radar signal, and naturally, a received echo signal may also be the radar signal. As shown in FIG. 17, the signal processing method may include the following steps.

S1701: Generate the first signal and the second signal.

In this embodiment of this application, the first radar detection apparatus may be a radar detection apparatus that needs to send the radar signal. Therefore, when the first radar detection apparatus needs to send the radar signal, at least two signals such as the first signal and the second signal are first generated. The first signal and the second signal each correspond to one time domain range in time domain, and time-frequency resources in two time domain ranges are different. The detection apparatus may perform channel listening based on the first signal and the second signal, to determine an appropriate time-frequency resource for sending the radar signal.

Optionally, in this embodiment of this application, a time domain range of the first signal is a first time domain range, and a time domain range of the second signal is a second time domain range. The first time domain range may include a plurality of first frequency sweep periods. Each first frequency sweep period corresponds to a first sub-signal. The second time domain range may include a plurality of second frequency sweep periods. Each second frequency sweep period corresponds to a second sub-signal.

Optionally, in this embodiment, time-frequency resources in the time domain ranges corresponding to the first signal and the second signal may be time-frequency resources that the first radar detection apparatus wants to use. In this way, when performing channel listening based on the first signal and the second signal, the first radar detection apparatus can determine an appropriate time-frequency resource from all time-frequency resources that the first radar detection apparatus wants to use.

It should be noted that step S1701 is optional. In another possible implementation, S1701 may be replaced with: generating the first listening signal and the second listening signal, where the first listening signal corresponds to at least one first sub-signal in the first signal, and the second listening signal corresponds to at least one second sub-signal in the second signal. "Corresponding" herein means that a waveform, a time domain resource, and a frequency domain resource of the first listening signal are the same as those of at least one sub-signal in the first signal.

S1702: Perform channel listening based on the first signal and the second signal, where the channel listening includes performing channel listening based on the first listening signal in the first time domain range and performing channel listening based on the second listening signal in the second time domain range. "Performing channel listening based on the first signal and the second signal" herein may also be understood as performing channel listening based on listening signals, that is, performing channel listening based on the first listening signal and the second listening signal. The first listening signal and the second listening signal respectively correspond to a sub-signal in the first signal and a sub-signal in the second signal. Listening is not limited to being performed based on the whole of the first signal and the second signal.

In this embodiment, the first time domain range and the second time domain range are time domain ranges in the L time domain ranges. L is a positive integer greater than 1. Any one of the L time domain ranges partially overlaps at least one of other (L−1) time domain ranges. An absolute value of a difference between time domain start locations of any two of the L time domain ranges is greater than or equal to a first threshold and less than or equal to a second threshold.

The first listening signal corresponds to the first sub-signal that is of the first signal and that is in at least one first frequency sweep period in the first time domain range. The second listening signal corresponds to the second sub-signal that is of the second signal and that is in at least one second frequency sweep period in the second time domain range. The first sub-signal of the first signal in at least one frequency sweep period and the second sub-signal of the second signal in at least one second frequency sweep period are listened, to determine one time domain range more suitable for target detection from the two time domain ranges corresponding to the two signals.

For example, the first radar detection apparatus may perform channel listening based on the first signal and the second signal. Specifically, the first radar detection apparatus may perform a listen-before-talk (Listen-Before-Talk, LBT) channel access mechanism in the first time domain range based on the first listening signal. In addition, the first radar detection apparatus may also perform the LBT channel access mechanism in the second time domain range based on the second listening signal, so that results of the channel listening in the first time domain range and the second time domain range may be obtained.

Optionally, an LBT listening mechanism is clear channel assessment (Clear Channel Assessment, CCA). Specifically, the first radar detection apparatus evenly and randomly generates a backoff counter N between 0 and a contention window size (Contention Window Size, CWS). The first radar detection apparatus separately performs channel listening based on the first sub-signal in the at least one first frequency sweep period in the first time domain range and the first second sub-signal in the at least one second frequency sweep period in the second time domain range. The first radar detection apparatus determines, based on a busy state or idle state of a channel, whether the backoff counter is decremented by 1. If the channel is idle, the backoff counter is decremented by 1; on the contrary, if the channel is busy, the backoff counter is suspended, that is, the backoff counter N remains unchanged in channel busy time until that the channel is detected idle. When the backoff counter is decremented to 0, it is determined that the channel may be used in the first time domain range or the second time domain range.

Figure 18:
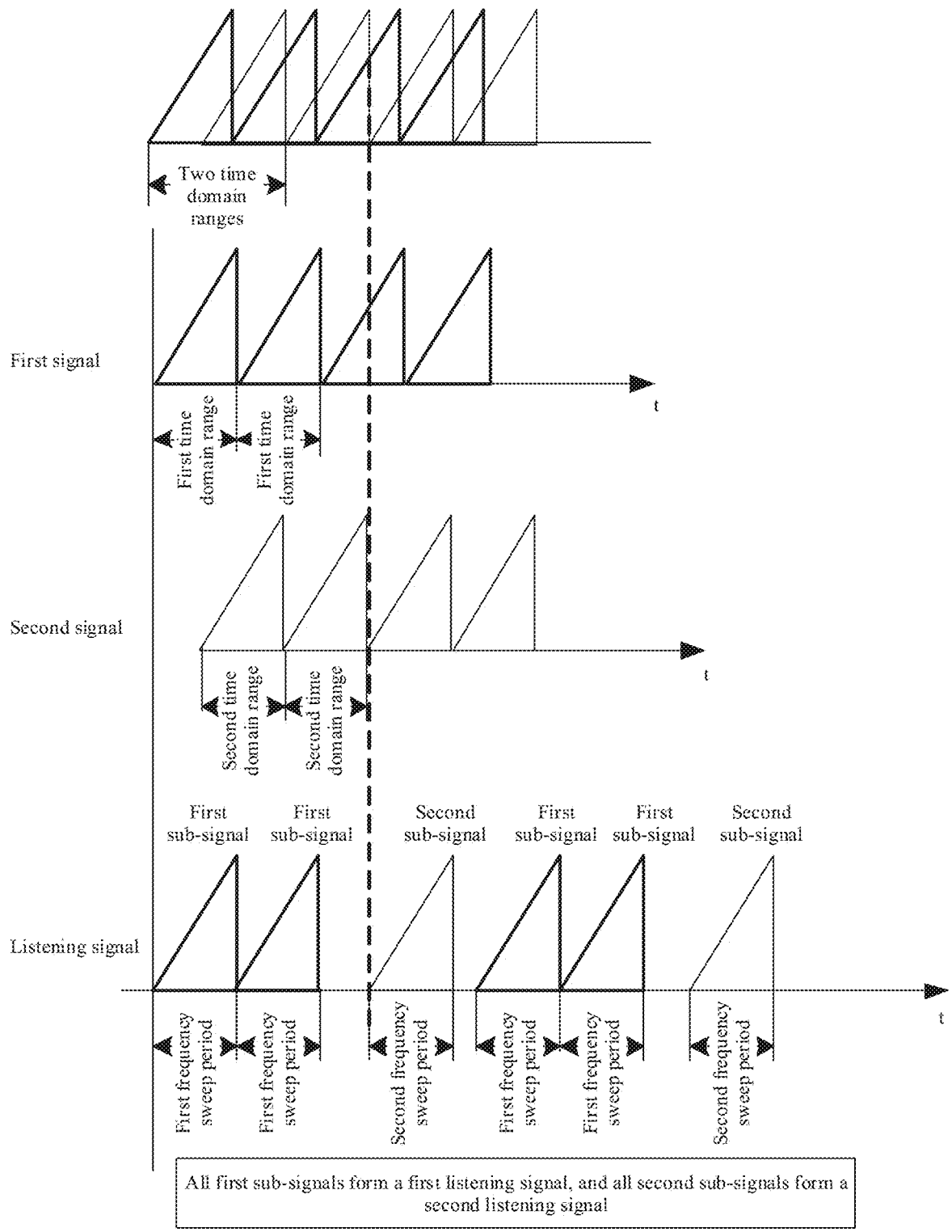
FIG. 18 is a schematic diagram in which time domain ranges corresponding to a first signal and a second signal are distributed in time domain.

For example, FIG. 18 is a schematic diagram in which time domain ranges corresponding to the first signal and the second signal are distributed in time domain. As shown in FIG. 18, in this embodiment, the time domain range of the first signal is the first time domain range. The first signal includes the first listening signal. The first listening signal is the first sub-signal that is of the first signal and that is in the at least one first frequency sweep period in the first time domain range. The time domain range of the second signal is the second time domain range. The second signal includes the second listening signal. The second listening signal is the second sub-signal that is of the second signal and that is in the at least one second frequency sweep period in the second time domain range. For a specific relationship between the first signal, the first listening signal, and the first sub-signal, and a specific relationship between the second signal, the second listening signal, and the second sub-signal, refer to FIG. 18. Details are not described herein again.

Optionally, in this embodiment, as shown in FIG. 18, time domain resources of the first sub-signal and the second sub-signal do not overlap, that is, time domain resources of the first listening signal and the second listening signal do not overlap. When the time domain resources of the first sub-signal and the second sub-signal do not overlap, only after the first radar detection apparatus performs channel listening based on the first listening signal and the second listening signal, the determined first time-frequency resource for target detection may not overlap a time domain resource occupied by another radar detection apparatus, so that mutual interference between subsequent radar detection apparatuses is avoided.

Optionally, as shown in FIG. 18, duration of the first frequency sweep period and duration of the second frequency sweep period are the same, and waveforms of the first signal and the second signal are the same. In this way, design difficulty of the first signal and the second signal may be reduced, and an implementation possibility is improved.

In this embodiment of this application, the L time domain ranges may be referred to as a set of time domain ranges. Certainly, the L time domain ranges and each of the L time domain ranges may also be defined as other names. Regardless of names of the L time domain ranges and each of the L time domain ranges, the L time domain ranges indicate a time length of a relatively coarse granularity, and each time domain range indicates a time length of a relatively fine granularity.

Any one of the L time domain ranges partially overlaps (or in other words, not fully overlaps) at least one of other (L−1) time domain ranges. For example, that two time domain ranges time domain fully overlap means that the two time domain ranges are the same, for example, time domain start locations of the two time domain ranges are the same and time domain end locations are the same. Alternatively, that two time domain ranges fully overlap means that one of the two time domain ranges is completely included in the other time domain range. That two time domain ranges do not fully overlap means that the two time domain ranges have an intersection, but the two time domain ranges are not the same. For example, time domain start locations of the two time domain ranges are the same but time domain end locations are different, or time domain start locations of the two time domain ranges are different but time domain end locations are the same, or time domain start locations of the two time domain ranges are different and time domain end locations are different. Through this design, a fully time-divided resource design can be avoided, and time domain resources can be reduced. In addition, distribution density of radar detection apparatuses in time domain can be appropriately adjusted, so that as many radar detection apparatuses as possible transmit radar signals in a specific time domain length on the premise of ensuring high-performance communication.

By using a design manner in which the plurality of time domain ranges partially overlap, a waste of time domain resources caused by completely separating a plurality of frequency sweep periods of the first radar detection apparatus in the plurality of time domain ranges in time domain may be avoided, time domain resources may be effectively used, relatively high anti-interference performance may be implemented at relatively low time domain resource costs, and communication of more radar detection apparatuses can be supported.

It may be understood that "L" in this embodiment of this application may be predefined or preconfigured, or may be determined according to a preset rule. For example, for one radar detection apparatus, "L" may be embodied as L candidate time domain grids in one frequency sweep period, and each time domain grid and specific duration form one time domain range. The time domain grid may be a start location or an end location of the time domain range, an intermediate location of the time-domain range, or the like. This is not specifically limited herein. Because the radar detection apparatus works in specific duration, the solutions are described and explained by using the "time domain range" in this application. Technically, the time domain range may be defined by using a time domain grid and duration. Therefore, the first time domain range and the second time domain range may be described as that the first time domain grid and the second time domain grid are time domain grids in the L time domain grids, and any one of the L time domain grids partially overlaps at least one of other (L−1) time domain grids.

For example, in this embodiment, an absolute value of a difference between time domain start locations of any two of the L time domain ranges is greater than or equal to the first threshold and less than or equal to the second threshold. The first threshold and the second threshold may be specifically determined in the following manner:

The first threshold or the second threshold or both are predefined, or the first threshold or the second threshold or both are determined according to a preconfigured rule.

In this embodiment, to reduce difficulty in determining a time domain range corresponding to a signal such as the first signal or the second signal, and explicitly learn a relationship between time domain start locations of any two of the L time domain ranges, the first threshold and/or the second threshold may be predefined in the first radar detection apparatus, or a configuration rule of the first threshold and/or the second threshold may be preconfigured. In this way, when the first radar detection apparatus needs to perform channel listening, the first radar detection apparatus may accurately determine a time domain range corresponding to each signal, and therefore determine a time domain resource that does not overlap a time domain resource used by another radar detection apparatus. Therefore, mutual interference between the radar detection apparatuses may be avoided.

Optionally, that the first threshold and/or the second threshold are/is determined according to the preconfigured rule may be explained as follows: The first threshold is determined based on at least one echo delay and at least one propagation delay. The at least one echo delay includes an echo delay (for example, referred to as a first echo delay) corresponding to a maximum detection distance of the first radar detection apparatus. The at least one propagation delay includes a propagation delay (for example, referred to as a first propagation delay) corresponding to a first radar signal sent by the first radar detection apparatus.

It may be understood that a preconfigured specific rule used to determine the first threshold and/or the second threshold is not limited in this embodiment of this application. In different scenarios, a rule may be determined based on an actual situation. Details are not described herein again.

In this embodiment, that an absolute value of a difference between time domain start locations of any two of the L time domain ranges is greater than or equal to the first threshold and less than or equal to the second threshold may include the following two cases:

In an example, a difference between start locations of any two adjacent time domain ranges in the L time domain ranges is the same. In other words, time domain start locations of the L time domain ranges are equally spaced in time domain. In this example, if an absolute value of a difference between time domain start locations of any two "adjacent" time domain ranges in the L time domain ranges in time domain is equal to, for example, F, an absolute value of a difference between time domain start locations of any two "non-adjacent" time domain ranges in time domain may be equal to X times as much as F. X is a positive integer greater than 1.

It may be understood that if the L time domain ranges are arranged in a front-to-back order of time domain, for example, the L time domain ranges sequentially include a first time domain range, a second time domain range, a third time domain range, and the like, the first time domain range and the second time domain range are "adjacent" time domain ranges in time domain, the second time domain range and the third time domain range are also "adjacent" time domain ranges in time domain, and the first time domain range and the third time domain range are "non-adjacent" time domain ranges in time domain.

In another example, the time domain start locations of the L time domain ranges are not equally spaced in time domain. In this example, if an absolute value of a difference between time domain start locations is the smallest for two of the L time domain ranges, it is assumed that the absolute value of the difference between the time domain start locations of the two time domain ranges is equal to F. An absolute value of a difference between time domain start locations of any two time domain ranges other than the two of the L time domain ranges may be greater than F.

Figure 19:
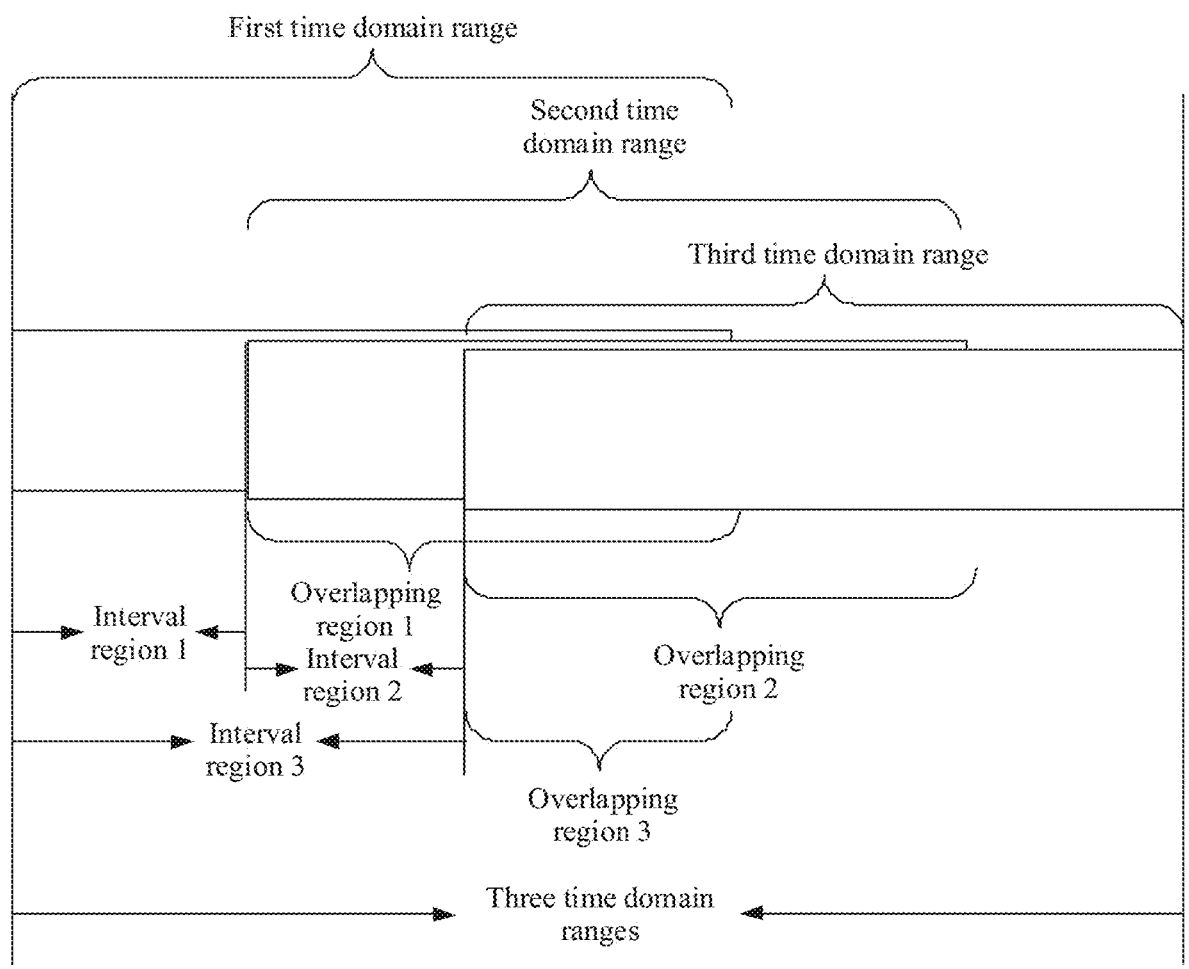
FIG. 19 is a schematic diagram of a time domain location relationship among three time domain ranges.

Optionally, the following describes a time domain location relationship of the L time domain ranges by using an example with reference to FIG. 19.

FIG. 19 is a schematic diagram of a time domain location relationship among three time domain ranges. As shown in FIG. 19, in this embodiment, L is equal to 3. In this case, the three time domain ranges may be respectively referred to as the first time domain range, the second time domain range, and the third time domain range. Any one of the three time domain ranges partially overlaps the other two time domain ranges. In FIG. 19, an overlapping region between the first time domain range and the second time domain range is marked as an overlapping region 1, an overlapping region between the first time domain range and the third time domain range is marked as an overlapping region 3, and an overlapping region between the second time domain range and the third time domain range is marked as an overlapping region 2.

As shown in FIG. 19, an absolute value of a difference between time domain start locations of any two of the three time domain ranges is greater than or equal to the first threshold and less than or equal to the second threshold. An absolute value of a difference between a time domain start location of the first time domain range and a start location of the second time domain range is a length of an interval region 1. An absolute value of a difference between the time domain start location of the second time domain range and a start location of the third time domain range is a length of an interval region 2. An absolute value of a difference between the time domain start location of the third time domain range and the start location of the first time domain range is a length of an interval region 3. In this embodiment of this application, the length of the interval region 1, the length of the interval region 2, and the length of the interval region 3 each are greater than or equal to the first threshold and less than or equal to the second threshold.

It should be noted that if the L time domain ranges sequentially include the first time domain range, the second time domain range, and the third time domain range in a front-to-back order of time domain, the absolute value of the difference between the time domain start locations of the first time domain range and the second time domain range is referred to as a first absolute value, and the absolute value of the difference between the time domain start locations of the second time domain range and the third time domain range is referred to as a second absolute value. The first absolute value may be equal to the second absolute value, or may not be equal to the second absolute value. However, both the first absolute value and the second absolute value are greater than or equal to the first threshold and less than or equal to the second threshold.

Optionally, in this embodiment of this application, the absolute value of the difference between the time domain start locations of the first time domain range and the second time domain range may be set to a smallest value in a calculated range, that is, the absolute value is equal to the first threshold. In this way, same available time domain resources may support a maximum quantity of radar detection apparatuses that do not interfere with each other. This greatly improves utilization of time domain resources.

The following describes a method for calculating a difference between time domain start locations between any two of the L time domain ranges.

In this embodiment, time domain start locations of any two of the L time domain ranges are staggered, so that an interference frequency mixing signal of the radar detection apparatus falls outside an intermediate frequency detection bandwidth. Therefore, mutual interference between the radar detection apparatuses is reduced.

Figure 20:
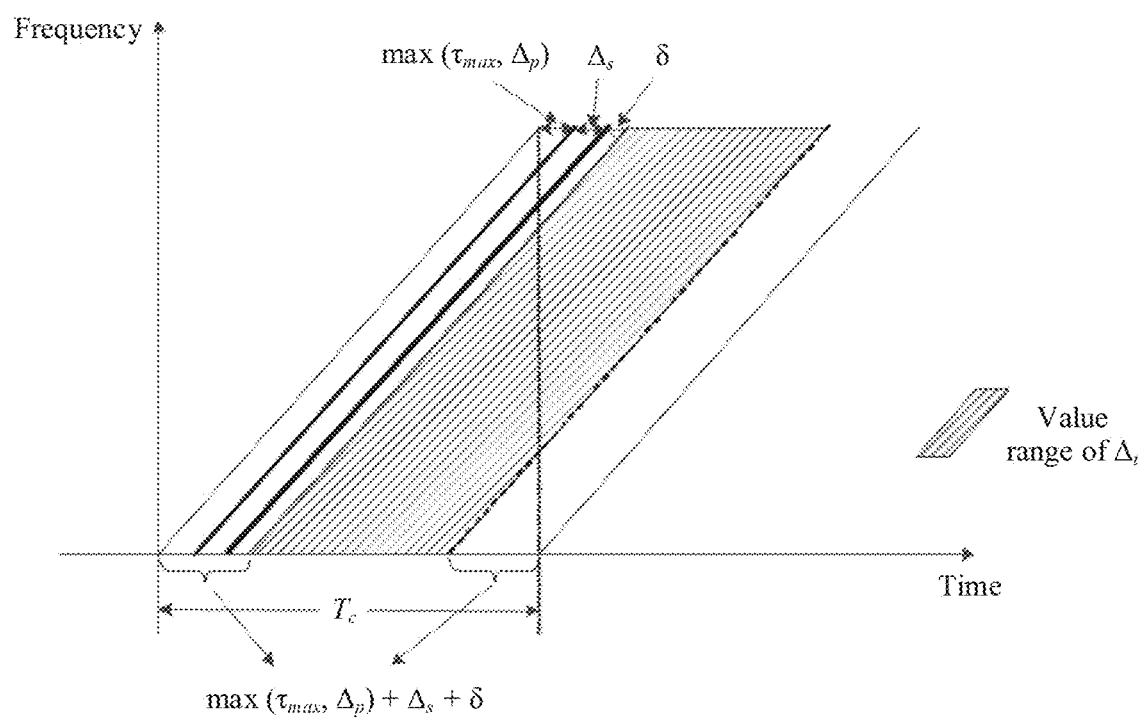
FIG. 20 is a schematic diagram of calculating a difference between time domain start locations of any two of L time domain ranges.

For example, FIG. 20 is a schematic diagram of calculating a difference between time domain start locations of any two of the L time domain ranges. As shown in FIG. 20, this embodiment is described by using a plurality of waveform signals with a same slope. In this embodiment, $\Delta_s$ is a transmission moment difference between a plurality of radar detection apparatuses, $\Delta_p$ is a maximum value of a space propagation delay tolerable by a radar transmit signal that causes interference, $T_c$ is a working period of the radar detection apparatus, and $\tau_{max}$ is the echo delay corresponding to the maximum detection distance of the radar detection apparatus. $\delta$ is set to a margin caused by a non-ideal factor (it is assumed that a value is positive). It can be obtained through calculation that a difference $\Delta_t$ between start locations of any two adjacent time domain ranges in the L time domain ranges needs to meet the following condition.

$$\max(\tau_{max}, \Delta_p)+\Delta_s+\delta \leq \Delta_t \leq T_c-(\max(\tau_{max}, \Delta_p)+\Delta_s+\delta)$$

For example, it is assumed that parameters of the radar detection apparatus are as follows: $T_c$=27.8 µs, $\tau_{max}$=2 µs. If there is no time-frequency error between the radar detection apparatuses, that is, $\Delta_s+\delta$=0, and in this case, $\Delta_t$ meets the following condition: 2 µs$\leq\Delta_t\leq$25.8 µs. If there is a time-frequency error of 2 µs between the radar detection apparatuses, that is, $\Delta_s+\delta$=2 µs, and in this case, $\Delta_t$ meets the following condition: 4 µs$\leq\Delta_t\leq$23.8 µs.

Optionally, in this embodiment, a difference between start locations of any two adjacent time domain ranges in the L time domain ranges is less than or equal to 1/L Tc. Tc is the working period of the radar detection apparatus.

Correspondingly, in this embodiment, if the working period $T_c$ of the radar detection apparatus is equal to 27.8 µs, and a difference $\Delta_t$ between start locations of any two adjacent time domain ranges in Tc is equal to 4 µs, it can be known from $\Delta_t \leq T_c/L$ that $$L \leq \frac{T_c}{\Delta_t} = 27.8 \div 4 = 6.95.$$

Because L is a positive integer, in this embodiment, L is equal to 6, that is, there are six time domain ranges in one working period of the radar detection apparatus.

Optionally, in this embodiment of this application, the waveforms of the first signal and the second signal are the same. For example, a first frequency sweep period corresponding to the first signal is the same as a second frequency sweep period corresponding to the second signal. A first frequency sweep bandwidth corresponding to the first signal is the same as a second frequency sweep bandwidth corresponding to the second signal. Slopes of the first signal and the second signal at corresponding points are the same. To be specific, in duration corresponding to the L time domain ranges, to simplify complexity of channel listening performed by the first radar detection apparatus, designed waveforms of the first signal and the second signal are the same in this embodiment. That is, in time domain, duration of the first frequency sweep period in the first time domain range is the same as duration of the second frequency sweep period in the second time domain range.

For example, in a possible design of this application, the method may further include:

generating a third signal, where a time domain range corresponding to the third signal is a third time domain range.

Correspondingly, in this embodiment, the channel listening further includes performing channel listening based on a third listening signal in the third time domain range. The third time domain range belongs to the L time domain ranges. The third time domain range is different from the first time domain range and the second time domain range. The third listening signal corresponds to a third sub-signal that is of the third signal and that is in at least one third frequency sweep period in the third time domain range.

In this embodiment of this application, to determine an appropriate time-frequency resource from a relatively large quantity of time-frequency resources, the first radar detection apparatus may further generate the third signal. In addition, the third time domain range corresponding to the third signal is a time domain range that is in the L time domain ranges and that is different from the first time domain range and the second time domain range. Therefore, a third time-frequency resource corresponding to the third time domain range is a time-frequency resource that is different from the first time-frequency resource and the second time-frequency resource. Correspondingly, the channel listening performed by the first radar detection apparatus may further include performing channel listening based on the third listening signal in the third time domain range. In addition, the third listening signal corresponds to the third sub-signal that is of the third signal and that is in the at least one third frequency sweep period in the third time domain range. In other words, the first radar detection apparatus may simultaneously perform listening in frequency sweep periods in different time domain ranges, so that listening efficiency may be improved, and a time-frequency resource corresponding to the most appropriate time domain range may be determined.

Figure 21:
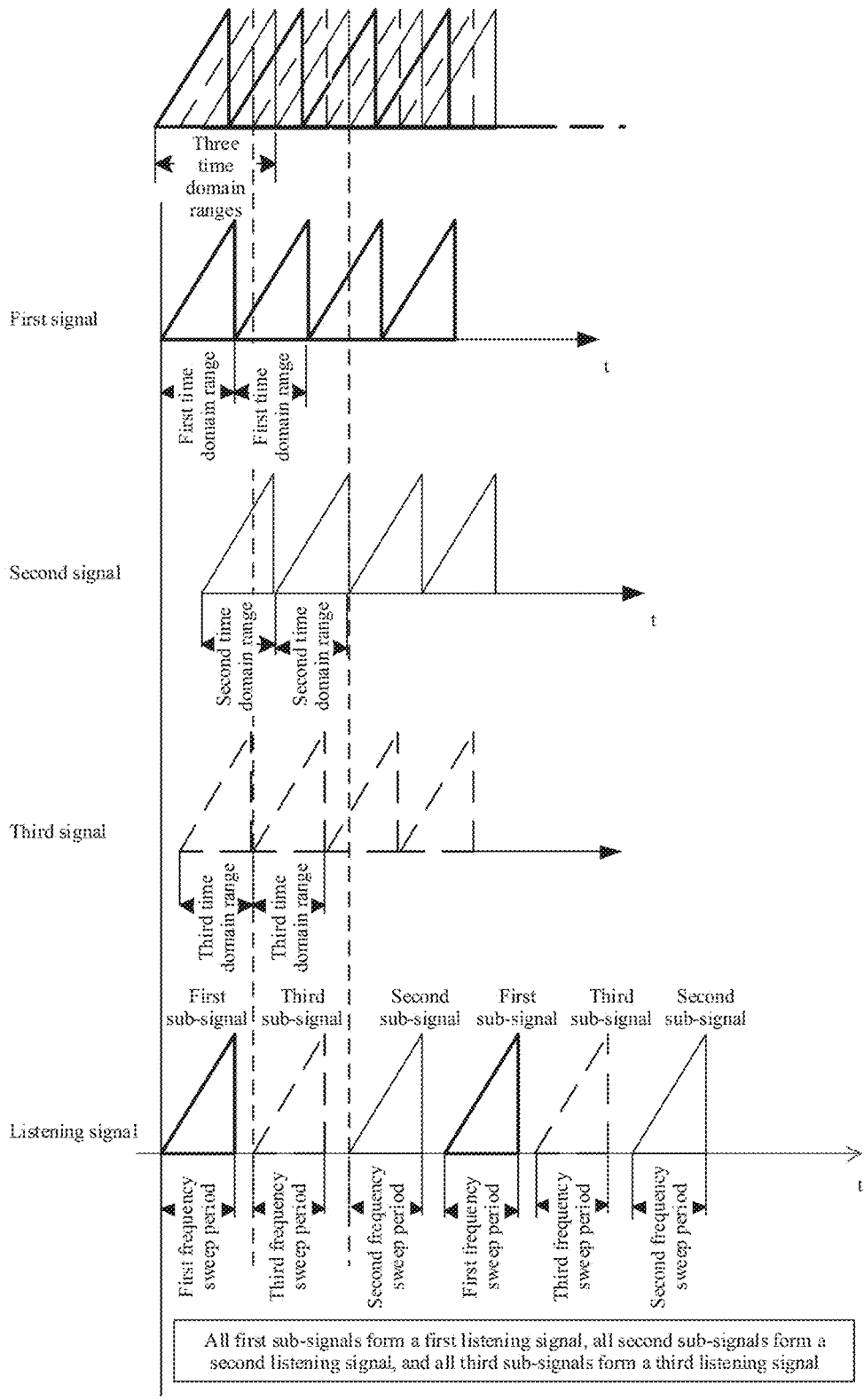
FIG. 21 is a schematic diagram in which time domain ranges corresponding to a first signal, a second signal, and a third signal are distributed in time domain.

For example, FIG. 21 is a schematic diagram in which time domain ranges corresponding to the first signal, the second signal, and the third signal are distributed in time domain. A difference between the schematic diagram shown in FIG. 21 and the schematic diagram shown in FIG. 18 lies in that the first radar detection apparatus further generates the third signal, and the first listening signal and the second listening signal that are used during channel listening are different. As shown in FIG. 21, in this embodiment, similar to the relationship between the first signal, the first listening signal, and the first sub-signal, a time domain range of the third signal is the third time domain range. The third signal includes the third listening signal. The third listening signal is the third sub-signal that is of the third signal and that is in the at least one third frequency sweep period in the third time domain range. For a specific relationship between the first signal, the first listening signal, and the first sub-signal, a specific relationship between the second signal, the second listening signal, and the second sub-signal, and a specific relationship between the third signal, the third listening signal, and the third sub-signal, refer to FIG. 21. Details are not described herein again.

Optionally, in this embodiment, as shown in FIG. 21, time domain resources of the first sub-signal, the second sub-signal, and the third sub-signal do not overlap, that is, time domain resources of the first listening signal, the second listening signal, and the third listening signal do not overlap each other. In this way, after the first radar detection apparatus performs channel listening based on the first listening signal, the second listening signal, and the third listening signal, the determined first time-frequency resource for target detection may be orthogonal to a time domain resource occupied by another radar detection apparatus, so that mutual interference between subsequent radar detection apparatuses is avoided.

Optionally, as shown in FIG. 21, in time domain, duration of the first frequency sweep period, the second frequency sweep period, and the third frequency sweep period is the same. In frequency domain, the first frequency sweep bandwidth, the second frequency sweep bandwidth, and a third frequency sweep bandwidth are the same. In terms of waveforms, waveforms of the first signal, the second signal, and the third signal are also the same, indicating that slopes of different signals at a same position of the signal are the same.

Similarly, in another possible design of this application, the first radar detection apparatus may further generate a fourth signal, a fifth signal, or another quantity of signals, and time domain ranges corresponding to the plurality of signals are different time domain ranges in the L time domain ranges. In this way, when the plurality of signals are used to perform channel listening, an appropriate time-frequency resource may be determined from a plurality of time domain resources, thereby providing a possibility to avoid mutual interference between the plurality of radar detection apparatuses.

S1703: Determine, based on a result of the channel listening, the first time-frequency resource for target detection, where the time domain resource of the first time-frequency resource is the first time domain range.

In this embodiment of this application, after performing channel listening based on the first signal and the second signal, the first radar detection apparatus may obtain listening results in the first time domain range and the second time domain range, for example, an energy listening result and a resource usage listening result, to determine the first time-frequency resource suitable for target detection. The time domain resource of the first time-frequency resource is the first time domain range.

It may be understood that in this embodiment, the first time domain range may be any one of the L time domain ranges. The foregoing "first" and "second" do not represent a sequence, but represent only different content. For example, the "first time domain range" and the "second time domain range" are merely used to represent two different time domain ranges, and the "first time-frequency resource"

and the "second time-frequency resource" are merely used to represent different time-frequency resources.

In this embodiment, on a fixed frequency band, a time-frequency resource is in a one-to-one correspondence with a time domain range. To be specific, the time domain resource of the first time-frequency resource is the first time domain range, and the time domain resource of the second time-frequency resource is the second time domain range. Similarly, a time domain resource of an $N^{th}$ time-frequency resource is an $N^{th}$ time domain range.

Optionally, in this embodiment of this application, the method may further include the following steps.

S1704: Send the first signal on the first time-frequency resource.

In this embodiment, after determining the first time-frequency resource, the first radar detection apparatus may send the first signal on the first time-frequency resource. The first signal may be reflected back after reaching a target object, so that the first radar apparatus receives the reflected signal. The first radar apparatus performs frequency mixing on the reflected signal and a local oscillator signal to obtain an intermediate frequency signal. The first radar apparatus may determine one or more pieces of information such as a location, a velocity, or an angle of the target object based on the intermediate frequency signal.

It may be understood that if there is another radar detection apparatus that also needs to send the radar signal, for example, there is a second radar detection apparatus, the second radar detection apparatus may also determine, based on the foregoing steps S1701 to S1703, a second time-frequency resource suitable for the second radar detection apparatus, and a time domain range of the second time-frequency resource is the second time domain range. Therefore, different radar detection apparatuses use different time-frequency resources, so that mutual interference between different radar detection apparatuses is avoided.

In other words, different radar detection apparatuses may select different time-frequency resources to send radar signals. The first time domain range and the second time domain range may or may not have an intersection. If the first time domain range and the second time domain range have an intersection, the absolute value of the difference between the time domain start locations of the first time domain range and the second time domain range needs to be greater than or equal to the first threshold and less than or equal to the second threshold.

According to the signal processing method provided in this embodiment of this application, channel listening is performed based on the first signal and the second signal. The channel listening includes performing channel listening based on the first listening signal in the first time domain range and performing channel listening based on the second listening signal in the second time domain range. Finally, based on the result of the channel listening, the first time-frequency resource for target detection is determined. The time domain resource of the first time-frequency resource is the first time domain range, so that the first signal may be sent on the first time-frequency resource. According to the technical solution, it can be ensured that a mutual interference region of the radar detection apparatus disappears, and a false alarm or an interference platform is avoided, so that target detection accuracy of the radar detection apparatus is improved, and driving safety and user comfort are ensured to some extent.

For example, in another possible design of this application, S1702 may be implemented by using the following steps:

performing listening in a plurality of listening regions, where an absolute value of a difference between start locations of any two of the plurality of listening regions in time domain is an integer multiple of M, and M is predefined or preconfigured.

Optionally, the listening region may be understood as a preset time period in which the first radar detection apparatus performs signal listening before transmitting a signal used for target detection. Correspondingly, the plurality of listening regions are a plurality of preset time periods in which listening is performed. These preset time periods may partially overlap or may not overlap. In this embodiment of this application, whether the plurality of preset time periods of listening, namely, the plurality of listening regions, overlap is not limited. The plurality of preset time periods of listening may be determined based on duration of the listening region and a value of M. Details are not described herein again.

It may be understood that in this embodiment, known signals are the first signal and the second signal, or known signals are the first listening signal and the second listening signal.

In an embodiment of this application, the first radar detection apparatus may first determine all listening signals for performing channel listening, then determine a plurality of listening regions in which channel listening needs to be performed, and finally perform channel listening in each listening region based on all the listening signals, to obtain a channel listening result of each listening region.

For example, when the first radar detection apparatus performs listening based on the first signal and the second signal, all the foregoing listening signals include the first listening signal in the first signal and the second listening signal in the second signal. When the first radar detection apparatus performs listening based on the third signal in addition to the first signal and the second signal, all the foregoing listening signals include the first listening signal in the first signal, the second listening signal in the second signal, and the third listening signal in the third signal. Specific composition of all listening signals is not limited in this embodiment, and may be set according to an actual requirement.

Optionally, the first radar detection apparatus may determine continuous transmission duration based on a timing clock of the first radar detection apparatus, and then determine a plurality of listening regions based on the continuous transmission duration. The continuous transmission duration is duration for transmitting a signal in a refresh period of the radar detection apparatus, or may be interpreted as activation duration of the first radar detection apparatus, namely, a time length occupied by the first radar detection apparatus to transmit a signal in a target detection process.

In this embodiment of this application, the refresh period includes duration for at least one time of target detection (for example, target detection performed in at least one time of activation duration) and/or duration for at least one signal processing (for example, at least one silence duration or an idle time period, namely, "idle time" in the silence duration or a signal processing process during which a radar does not transmit a signal). Optionally, the refresh period is periodically set, and is usually 50 ms (for example, activation duration of 20 ms+silence duration of 30 ms), or may be another value. Specifically, for each periodically executed refresh period, activation duration or silence duration included in the refresh period may be the same or different. For example, a current refresh period (duration is 50 ms) includes activation duration of 20 ms and silence duration of 30 ms. The next refresh period in time domain may include activation duration of 30 ms and silence duration of 20 ms, or include silence duration of 50 ms (this refresh period may be referred to as a silence refresh period).

The activation duration is a time range in which a radar performs target detection, and may also be referred to as a transmission time period. Specifically, the activation duration is usually continuous duration. This application may also cover a scenario in which the activation duration is discontinuous duration. This is not specifically limited. The activation duration varies depending on a radar type. Generally, the activation duration is in the millisecond (ms) level, for example, 10 ms or 20 ms. Generally, longer the activation duration indicates better radar detection performance. Optionally, the activation duration may be limited by a size of the refresh period and the silence duration. For example, the radar completes target detection and signal processing in a refresh period. The target detection and the signal processing may be performed in a sequence, or may be performed simultaneously. This is not specifically limited in this application. Therefore, setting of the activation duration needs to consider detection performance and a processing capability of the radar.

It should be noted that an initial value of at least one of the refresh period and the activation duration may be set when the radar is delivered from a factory. After delivery, in a working state of the radar or in another possible scenario, at least one of the refresh period and the activation duration may change. The change is not limited to adjustment performed by the radar, manual adjustment, or the like.

In addition, because the radar generates heat when performing target detection, if the activation duration is excessively long, the radar generates excessive heat, which affects performance of the radar. Therefore, a specific value of the activation duration is not limited in this application, and may be set based on an actual requirement.

In an embodiment of this application, the duration of the listening region may be the same as the continuous transmission duration.

In another embodiment of this application, if listening is performed in an idle time period, total time length of the plurality of listening regions is less than or equal to duration of the idle time period.

For example, a difference between start locations of any two listening regions in time domain may be an integer multiple of M. M is predefined or preconfigured. For example, M is a preset listening step. The listening step may be preconfigured or predefined based on a processing capability of the first radar detection apparatus. Generally, a smaller listening step indicates finer listening but longer processing time. Therefore, a specific value of M is not limited in this embodiment of this application, and may be determined based on an actual situation. Details are not described herein again.

Further, in this embodiment of this application, a channel listening result may be represented by listening energy of each listening region, or may be represented by an average power of each listening region, or may be represented in another manner. This is not limited herein.

In this embodiment of this application, based on a listening region division manner, performing listening in the plurality of listening regions may be implemented in any one of the following possible design manners.

In a possible design, the first radar detection apparatus may determine, based on the continuous transmission duration of the first radar detection apparatus, a listening range and a plurality of listening regions included in the listening range, then separately perform channel listening in each listening region based on all listening signals, to obtain a listening result in each listening region, and then determine, based on the listening result, the time-frequency resource for target detection. Specifically, the first radar detection apparatus may determine a transmit signal (a listening signal) for target detection, and then determine, based on a correspondence between a time domain range of a signal to which the listening signal belongs and time-frequency resources, the time-frequency resource for target detection.

For example, if the transmit signal is the first listening signal, the first radar detection apparatus may use, as the time-frequency resource for target detection used by the first radar detection apparatus, the first time-frequency resource corresponding to the first time domain range of the first signal to which the first listening signal belongs.

Figure 22:
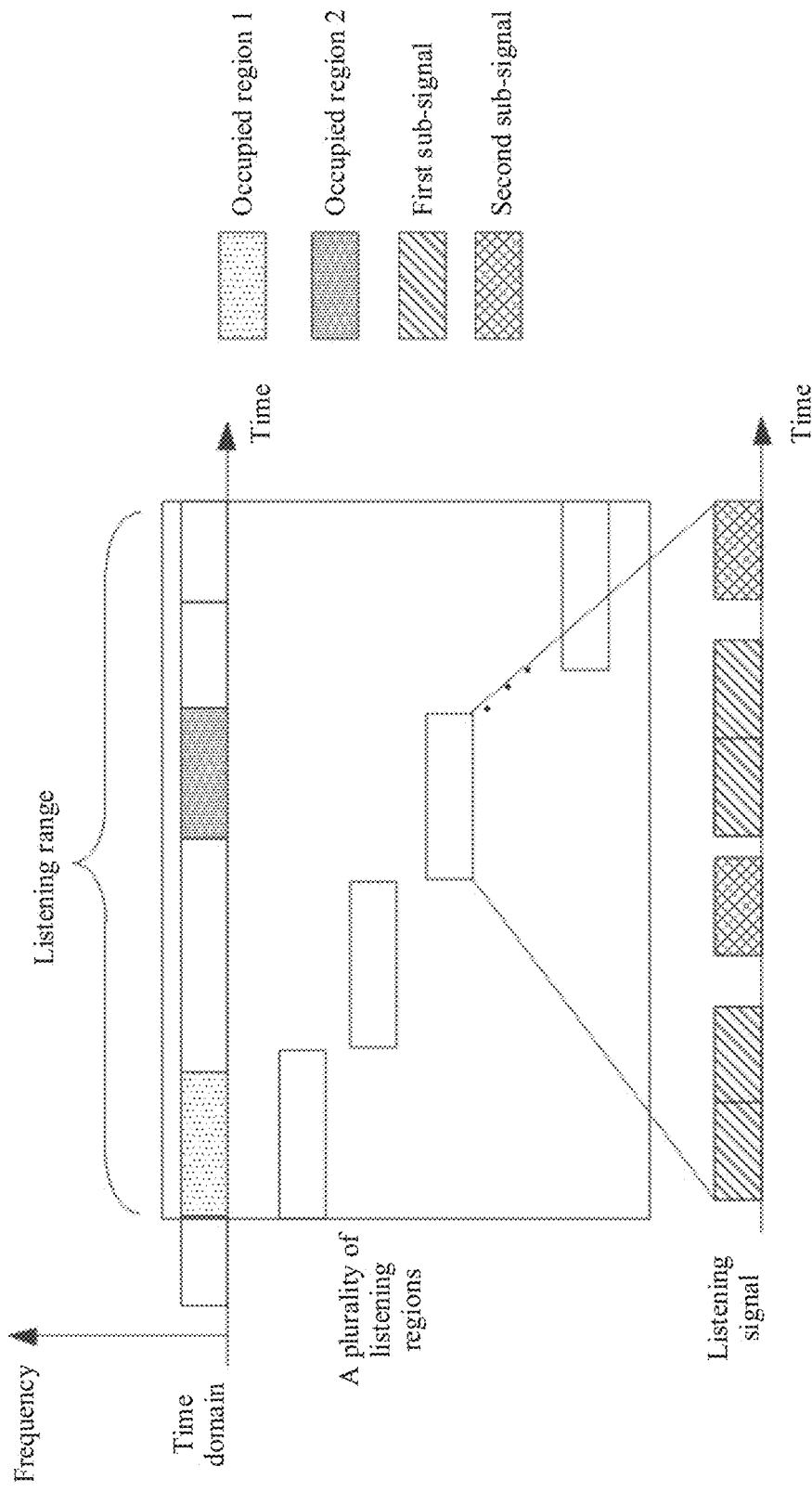
FIG. 22 is a schematic diagram of a possible design of performing channel listening in a plurality of listening regions.

For example, FIG. 22 is a schematic diagram of a possible design of performing channel listening in a plurality of listening regions. As shown in FIG. 22, the listening range of the first radar detection apparatus includes the plurality of listening regions. The first radar detection apparatus may perform listening in each listening region based on all listening signals in a window sliding manner. The first radar detection apparatus determines a sum of energy obtained by performing intermediate frequency detection on all listening signals corresponding to each listening region, and then selects a target listening region with a minimum sum of energy from the plurality of listening regions. The first radar detection apparatus selects, from the target listening region, a listening signal with the smallest energy obtained by performing intermediate frequency detection and a signal corresponding to the listening signal. The signal is the transmit signal for target detection.

In this embodiment, intermediate frequency detection on a listening signal is a process of obtaining an intermediate frequency sampling signal based on the listening signal. In a specific example, intermediate frequency detection refers to performing frequency mixing on the listening signal and a corresponding received signal, passing through an intermediate frequency filter, then sampling an intermediate frequency sampling signal, and determining energy of the intermediate frequency sampling signal. The energy of the intermediate frequency sampling signal is energy obtained by performing intermediate frequency detection on the listening signal. It should be noted that a specific process of intermediate frequency detection is not limited in this application, and a person skilled in the art can obtain a corresponding intermediate frequency sampling signal based on a listening signal.

The foregoing sum of energy obtained by performing intermediate frequency detection on all listening signals corresponding to each listening region may be represented as a sum of energy obtained by adding energy obtained by performing intermediate frequency detection on all listening signals after intermediate frequency detection is separately performed on all listening signals, or the foregoing sum of energy may be represented as an average power of detected intermediate frequency sampling signals. A person skilled in the art may know that the sum of energy and the average power may be determined with reference to a calculation manner or rule in the conventional technology, which is not specifically limited herein.

For example, if a listening signal with the smallest energy in the target listening region is the first listening signal, the first signal corresponding to the first listening signal is the transmit signal for target detection.

For example, in the schematic diagram shown in FIG. 22, duration of each listening region is the same as the continuous transmission duration.

It may be understood that the first listening signal in this embodiment is a part of the first signal, and the first signal may be any one of all signals used for listening. This is not limited in this embodiment of this application.

In another possible design, the first radar detection apparatus may first determine, based on the known signals, a listening signal corresponding to each signal. Then, the first radar detection apparatus determines a plurality of listening regions based on the continuous transmission duration of the first radar detection apparatus, and separately performs channel listening in the plurality of listening regions based on each listening signal, to determine a listening result of each listening signal in each listening region. Based on each listening signal, the first radar detection apparatus selects, from all listening regions, a listening region as a target listening region of the listening signal (for example, a listening signal with the smallest energy obtained by performing intermediate frequency detection on the listening signal in the listening region). Finally, the first radar detection apparatus selects, from all the selected target listening regions, a time-frequency resource corresponding to a target listening region in which energy of the listening signal is the smallest, to be used for target detection. Specifically, the first radar detection apparatus may determine a listening signal corresponding to a target listening region in which energy of the listening signal is the smallest, to use the signal corresponding to the listening signal as the transmission signal for target detection.

Figure 23:
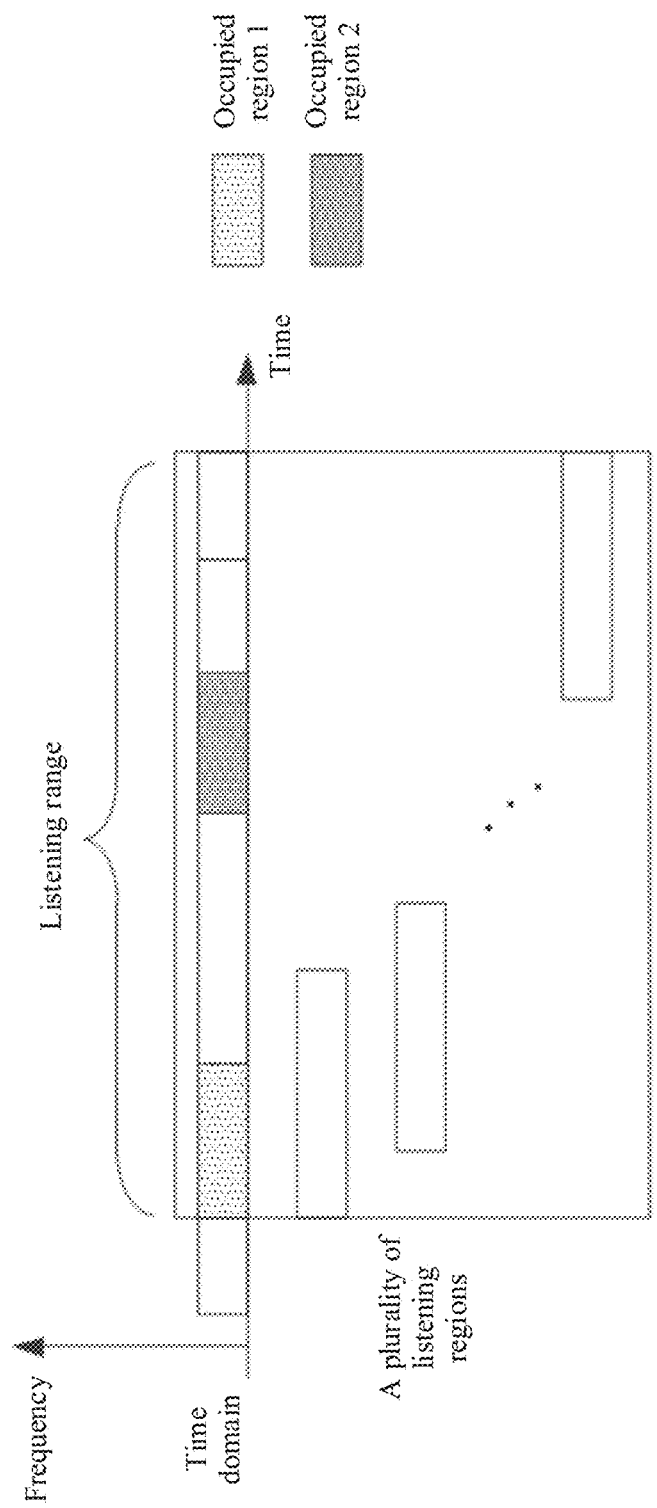
FIG. 23 is a schematic diagram of a possible design of performing channel listening in a plurality of listening regions.

For example, FIG. 23 is a schematic diagram of another possible design of performing channel listening in a plurality of listening regions. As shown in FIG. 23, the listening range of the first radar detection apparatus includes the plurality of listening regions. When the first radar detection apparatus generates the first signal and the second signal, all the foregoing listening signals include the first listening signal and the second listening signal. In this embodiment, the first radar detection apparatus separately performs channel listening in the plurality of listening regions based on the first listening signal and the second listening signal, to determine listening energy of each listening signal in each listening region. Then, based on the first listening signal and the second listening signal, the first radar detection apparatus separately selects, from all listening regions as a target listening region of the listening signal, a listening region with the smallest listening energy. For example, the first listening signal corresponds to the first target listening region, and the second listening signal corresponds to the second target listening region. Finally, the first radar detection apparatus selects a target listening region with the smallest listening energy from the first target listening region and the second target listening region, and uses, as a transmission signal for target detection, a signal to which a listening signal corresponding to the listening region belongs. In this way, a time start point of the listening region and a selected signal may be determined.

For example, in the schematic diagram shown in FIG. 23, duration of each listening region is greater than the continuous transmission duration of the first radar detection apparatus.

Further, in this embodiment of this application, performing listening in a plurality of listening regions may alternatively be implemented in the following possible design manners.

The first radar detection apparatus may not divide listening regions, but performs listening in the listening range by using the timing clock of the first radar detection apparatus based on each listening signal, to determine signal energy of each listening signal in the listening range. The first radar detection apparatus compares the signal energy of each listening signal in the listening range, to determine a listening signal with the smallest signal energy, and uses, as a transmit signal for target detection, a signal to which the listening signal belongs.

It can be learned from the foregoing analysis that the first radar detection apparatus may perform listening in the plurality of listening regions in a plurality of manners, to determine a time-frequency resource most suitable for target detection.

For example, in still another possible design of this application, S1702 may be implemented by using the following steps:

performing channel listening on a predefined or configured time domain resource, where the time domain resource includes at least one of the following: a refresh period of the first detection apparatus and a silent refresh period of the first detection apparatus, and the refresh period includes an idle time period and a transmission time period.

Figure 24:
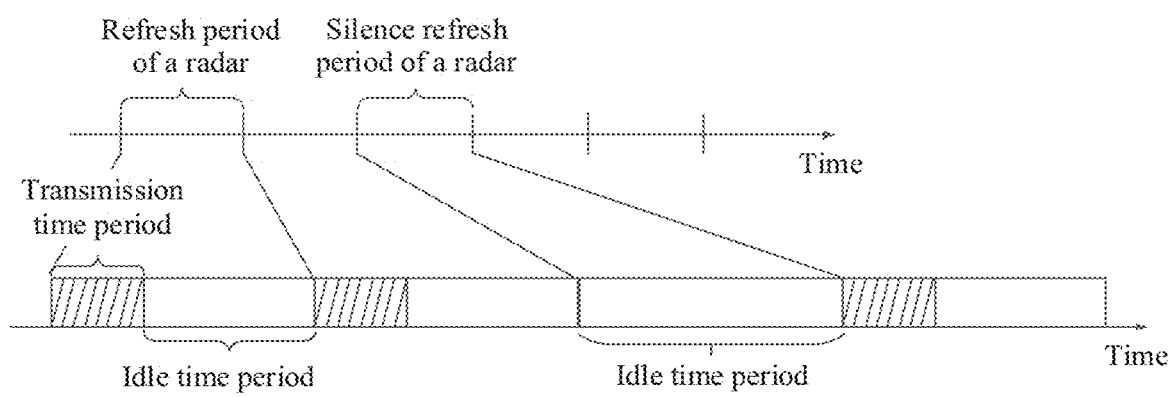
FIG. 24 is a schematic diagram of time distribution of a first radar detection apparatus in a working status.

For example, FIG. 24 is a schematic diagram of time distribution of the first radar detection apparatus in a working status. As shown in FIG. 17, the first radar detection apparatus works at a fixed refresh period. Generally, the refresh period includes an idle time period and a transmission time period. The first radar detection apparatus transmits a radar signal in the transmission time period of the refresh period to perform target detection, and performs signal processing or listens to a channel status in the idle time period of the refresh period. If the first radar detection apparatus does not transmit a signal in the entire refresh period, the entire refresh period is idle time, and the refresh period is referred to as a silent refresh period.

Optionally, the first radar detection apparatus may perform channel listening in the idle time period of the refresh period, or may perform channel listening in the transmission time period of the refresh period, or may perform channel listening in the silent refresh period. In this way, the most appropriate (most idle) time-frequency resource may be determined for subsequent target detection.

Further, in this embodiment of this application, if the first radar detection apparatus supports a plurality of frequency bands, the signal processing method provided in this application further includes the following steps:

when all frequency bands corresponding to the predefined or configured time domain resource are in an occupied state, hopping to a frequency band other than a preset frequency band to perform channel listening.

Specifically, if time-frequency resources listened by the first radar detection apparatus are not idle in a current frequency band, the first radar detection apparatus may hop to another frequency band to perform listening. A specific listening manner is implemented by using specific implementations of S1701 to S1703 shown in FIG. 17. Details are not described herein again.

It may be understood that in this embodiment of this application, the radar detection apparatus may be a movable radar detection apparatus, for example, a vehicle-mounted radar, or may be a fixed radar detection apparatus, for example, the radar detection apparatus is fixed on an RSU, a base station, or another device. Alternatively, the radar detection apparatus may be independently deployed, but the location is fixed. A type of the radar detection apparatus is not limited in this embodiment of this application, and all the radar detection apparatuses are applicable.

According to the method provided in the foregoing embodiment, in a case in which there is no synchronization information (there is no GPS signal or there is no GPS function), each radar detection apparatus can still perform cooperative work, so that mutual interference between radar detection apparatuses is avoided, and driving safety and user comfort are improved.

The foregoing mainly describes the solutions provided in the embodiments of this application from the perspective of the first radar detection apparatus or from the perspective of interaction between the first radar detection apparatus and a radar detection apparatus or a target object. The formulas involved in the foregoing solutions are only a specific expression manner. Possible modification or rewriting of the foregoing formulas that is made to resolve a same technical problem and achieve a same or similar technical effect falls within the protection scope of the embodiments of this application. It may be understood that, to implement the foregoing functions, each apparatus such as the first radar detection apparatus includes corresponding hardware structures and/or software modules to implement the functions. A person skilled in the art should be easily aware that, with reference to the units and algorithm steps described in embodiments disclosed in this application, embodiments of this application can be implemented in a form of hardware or hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of embodiments of this application.

In embodiments of this application, the first radar detection apparatus may be divided into function modules. For example, function modules may be obtained through division based on functions, or two or more functions may be integrated into one processing module. The integrated module may be implemented in a form of hardware, or may be implemented in a form of a software function module. It should be noted that, in embodiments of this application, module division is an example, and is merely a logical function division. In actual implementation, another division manner may be used.

Figure 25:
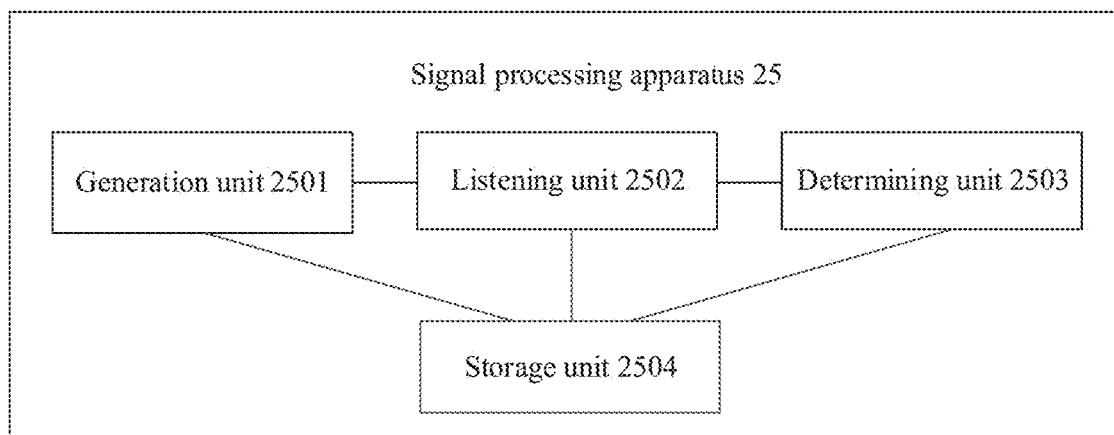
FIG. 25 is a schematic diagram of a possible structure of a signal processing apparatus according to an embodiment of this application.

For example, when function modules of a radar detection apparatus are obtained through division in an integrated manner, FIG. 25 is a schematic diagram of a possible structure of a signal processing apparatus according to an embodiment of this application. The signal processing apparatus may be the first radar detection apparatus in the foregoing method embodiment. Optionally, as shown in FIG. 25, the signal processing apparatus 25 may include a listening unit 2502 and a determining unit 2503.

The listening unit 2502 is configured to perform channel listening based on a first signal and a second signal. The channel listening includes performing channel listening based on a first listening signal in a first time domain range and performing channel listening based on a second listening signal in a second time domain range.

The determining unit 2503 is configured to determine, based on a result of the channel listening, a first time-frequency resource for target detection. A time domain resource of the first time-frequency resource is the first time domain range.

The first time domain range and the second time domain range are time domain ranges in L time domain ranges. L is a positive integer greater than 1. Any one of the L time domain ranges partially overlaps at least one of other (L−1) time domain ranges. An absolute value of a difference between time domain start locations of any two of the L time domain ranges is greater than or equal to a first threshold and less than or equal to a second threshold.

The first listening signal corresponds to a first sub-signal that is of the first signal and that is in at least one first frequency sweep period in the first time domain range, and the second listening signal corresponds to a second sub-signal that is of the second signal and that is in at least one second frequency sweep period in the second time domain range.

Optionally, the apparatus further includes a generation unit 2501.

The generation unit 2501 is configured to generate the first signal and the second signal.

Alternatively, the generation unit 2501 is configured to generate the first listening signal and the second listening signal.

In a possible design of this application, time domain resources of the first sub-signal and the second sub-signal do not overlap.

In another possible design of this application, the first threshold or the second threshold or both are predefined, or the first threshold or the second threshold or both are determined according to a preconfigured rule.

In still another possible design of this application, a difference between start locations of any two adjacent time domain ranges in the L time domain ranges is the same.

A difference between start locations of any two adjacent time domain ranges in the L time domain ranges is less than or equal to 1/L Tc. Tc is a working period of a radar detection apparatus.

In still another possible design of this application, the generation unit 2501 is further configured to generate a third signal. A time domain range corresponding to the third signal is a third time domain range.

The channel listening further includes performing channel listening based on a third listening signal in the third time domain range. The third time domain range belongs to the L time domain ranges. The third time domain range is different from the first time domain range and the second time domain range. The third listening signal corresponds to a third sub-signal that is of the third signal and that is in at least one third frequency sweep period in the third time domain range.

In still another possible design of this application, the listening unit 2502 is specifically configured to perform listening in a plurality of listening regions. An absolute value of a difference between start locations of any two of the plurality of listening regions in time domain is an integer multiple of M. M is predefined or preconfigured.

In still another possible design of this application, the listening unit 2502 is specifically configured to perform channel listening on a predefined or configured time domain resource. The time domain resource includes at least one of the following: a refresh period of the first detection apparatus and a silent refresh period of the first detection apparatus. The refresh period includes an idle time period and a transmission time period.

Optionally, the signal processing apparatus 25 provided in this embodiment may further include a storage unit 2504. The storage unit 2504 is configured to store program instructions and/or data. Specifically, the storage unit 2504 may be configured to store a processing result of the generation unit

2501 and/or the listening unit 2502 and/or the determining unit 2503, or content stored by the storage unit 2504 is read by the generation unit 2501 and/or the listening unit 2502 and/or the determining unit 2503.

Optionally, the signal processing apparatus 25 provided in this embodiment may further include a transceiver unit. The transceiver unit may be configured to send a listening signal or a detection signal. For example, functions of the transceiver unit and the listening unit have an intersection.

The optional design may be implemented independently, or may be implemented through integration with any one of the foregoing optional designs.

Figure 26:
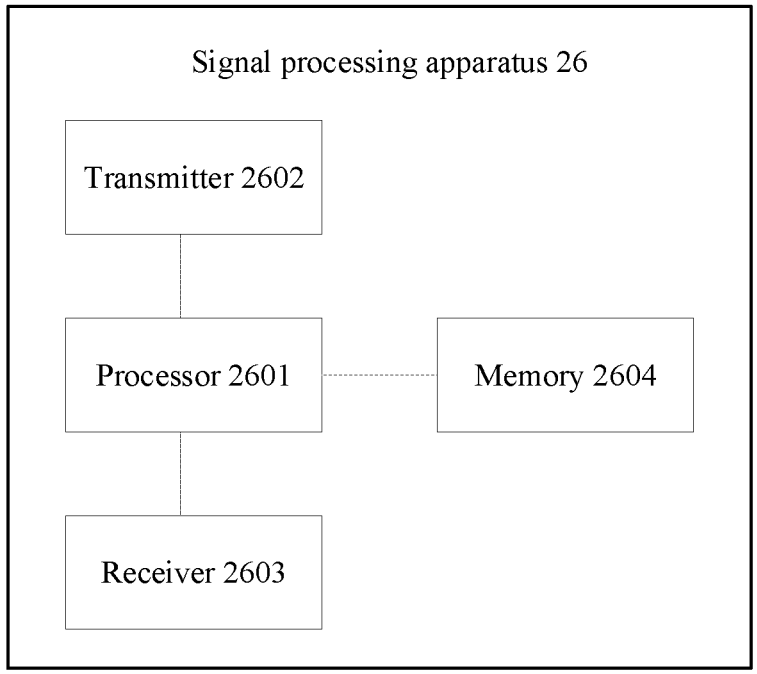
FIG. 26 is a schematic diagram of another possible structure of a signal processing apparatus according to an embodiment of this application.

FIG. 26 is a schematic diagram of another possible structure of a signal processing apparatus according to an embodiment of this application. Similarly, the signal processing apparatus may also be the first radar detection apparatus in the foregoing method embodiment. Optionally, as shown in FIG. 26, a signal processing apparatus 26 may include a processor 2601, a transmitter 2602, and a receiver 2603. Functions of the processor 2601 may correspond to specific functions of the generation unit 2501 and the determining unit 2503 shown in FIG. 25. Functions of the transmitter 2602 and the receiver 2603 may correspond to specific functions of the listening unit 2502 and the transceiver unit. Details are not described herein again.

Optionally, the signal processing apparatus 26 may further include a memory 2604. The memory 2604 is configured to store program instructions and/or data, and is specifically configured to store a processing result of the processor 2601 for being read by the processor 2601.

Figure 27:
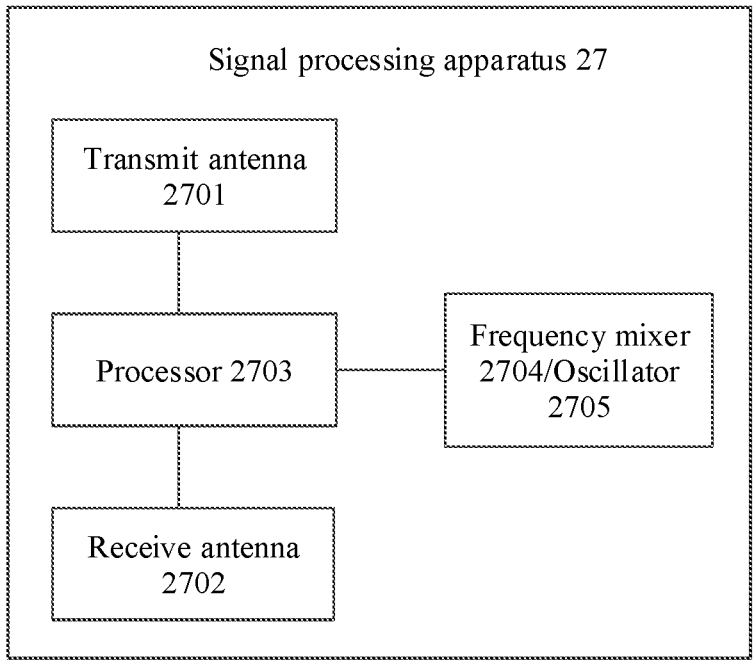
FIG. 27 is a schematic diagram of still another possible structure of a signal processing apparatus according to an embodiment of this application.

FIG. 1 is a schematic diagram of a structure of a radar apparatus. With reference to the foregoing content, another optional manner is provided. FIG. 27 is a schematic diagram of still another possible structure of a signal processing apparatus according to an embodiment of this application. The signal processing apparatuses provided in FIG. 25 to FIG. 27 may be a part or all of a radar apparatus in an actual communication scenario, or may be a functional module integrated into the radar apparatus or located outside the radar apparatus, for example, may be a chip system, provided that a corresponding function is implemented. A structure and composition of the signal processing apparatuses are not specifically limited.

In this optional manner, the signal processing apparatus 27 includes a transmit antenna 2701, a receive antenna 2702, and a processor 2703. Further, the signal processing apparatus 27 further includes a frequency mixer 2704 and/or an oscillator 2705. Further, the signal processing apparatus 27 may further include a low-pass filter, a directional coupler, and/or the like.

The transmit antenna 2701 and the receive antenna 2702 are configured to support the signal processing apparatus 27 in performing radio communication. The transmit antenna 2701 supports radar signal transmission, and the receive antenna 2702 supports radar signal reception and/or reflected signal reception, to finally implement a detection function. The processor 2703 performs some possible determining and/or processing functions. Further, the processor 2703 further controls operations of the transmit antenna 2701 and/or the receive antenna 2702. Specifically, the processor 2703 controls the transmit antenna 2701 to transmit a signal that needs to be transmitted, and a signal received by using the receive antenna 2702 may be transferred to the processor 2703 for corresponding processing.

Optionally, the components included in the signal processing apparatus 27 may be configured to cooperatively perform the method provided in the embodiment shown in FIG. 17. Optionally, the signal processing apparatus 27 may further include a memory, configured to store program instructions and/or data. The transmit antenna 2701 and the receive antenna 2702 may be independently disposed, or may be disposed as a transceiver antenna through integration to perform corresponding transmitting and receiving functions.

Figure 28:
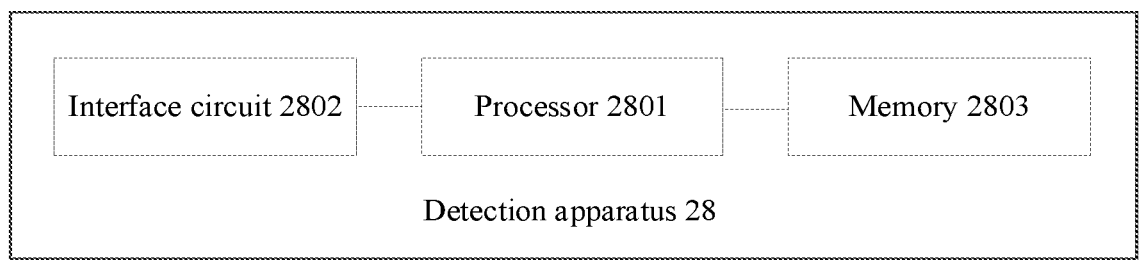
FIG. 28 is a schematic diagram of a structure of a detection apparatus according to an embodiment of this application.

FIG. 28 is a schematic diagram of a structure of a detection apparatus according to an embodiment of this application. The detection apparatus shown in FIG. 28 may be a first radar detection apparatus, or may be a chip or a circuit that can complete functions of the first radar detection apparatus. For example, the chip or the circuit may be disposed in the first radar detection apparatus. The detection apparatus 28 shown in FIG. 28 may include a processor 2801 (for example, the generation unit 2501 and the determining unit 2503 may be implemented by using the processor 2801, and the processor 2601 and the processor 2801 may be, for example, a same component) and an interface circuit 2802 (for example, the listening unit and the transceiver unit may be implemented by using the interface circuit 2802, and the transmitter 2602, the receiver 2603, and the interface circuit 2802 may be, for example, a same component). The processor 2801 may enable the detection apparatus 28 to implement the steps performed by the first radar detection apparatus in the method provided in the embodiment shown in FIG. 17. Optionally, the detection apparatus 28 may further include a memory 2803. The memory 2803 may be configured to store instructions. The processor 2801 executes the instructions stored in the memory 2803, so that the detection apparatus 28 implements the steps performed by the first radar detection apparatus in the method provided in the embodiment shown in FIG. 17.

Further, the processor 2801, the interface circuit 2802, and the memory 2803 may communicate with each other through an internal connection path, to transfer a control signal and/or a data signal. The memory 2803 is configured to store a computer program. The processor 2801 may invoke the computer program from the memory 2803 and run the computer program to control the interface circuit 2802 to receive a signal or send a signal, to complete the steps performed by the first radar detection apparatus in the method provided in the embodiment shown in FIG. 17. The memory 2803 may be integrated into the processor 2801, or may be disposed separately from the processor 2801.

Optionally, if the detection apparatus 28 is a device, the interface circuit 2802 may include a receiver and a transmitter. The receiver and the transmitter may be a same component or different components. When the receiver and the transmitter are a same component, the component may be referred to as a transceiver.

Optionally, if the detection apparatus 28 is a chip or a circuit, the interface circuit 2802 may include an input interface and an output interface. The input interface and the output interface may be a same interface, or may be different interfaces.

Optionally, if the detection apparatus 28 is a chip or a circuit, the detection apparatus 28 may not include the memory 2803. The processor 2801 may read instructions (a program or code) in a memory outside the chip or the circuit, to implement the steps performed by the first radar detection apparatus in the method provided in the embodiment shown in FIG. 17.

Optionally, if the apparatus 28 is the chip or the circuit, the apparatus 28 may include a resistor, a capacitor, or another corresponding functional component. The processor

2801 or the interface circuit 2802 may be implemented by using a corresponding functional component.

In an implementation, a function of the interface circuit 2802 may be implemented by using a transceiver circuit or a dedicated transceiver chip. The processor 2801 may be implemented by using a dedicated processing chip, a processing circuit, a processor, or a general-purpose chip.

In another implementation, the first radar detection apparatus provided in this embodiment of this application may be implemented by using a general-purpose computer. To be specific, program code for implementing functions of the processor 2801 and the interface circuit 2802 is stored in the memory 2803, and the processor 2801 implements the functions of the processor 2801 and the interface circuit 2802 by executing the program code stored in the memory 2803.

The functions and actions of the modules or units in the detection apparatus 28 enumerated above are merely examples for description. The functional units in the detection apparatus 28 may be configured to perform actions or processing processes performed by the first radar detection apparatus in the embodiment shown in FIG. 17. To avoid repetition, detailed descriptions are omitted herein.

It should be noted that a second radar detection apparatus, a third radar detection apparatus, a fourth radar detection apparatus, a fifth radar detection apparatus, or the like may have a same structure as the first radar detection apparatus. That is, these apparatuses may also be implemented by using the structures described in FIG. 25 to FIG. 28.

For example, an embodiment of this application further provides a computer-readable storage medium. The computer-readable storage medium stores a computer program. When the computer program is run on a computer, the computer is enabled to perform the method in the embodiment shown in FIG. 17.

Optionally, an embodiment of this application further provides a chip system. The chip system includes:
a memory, configured to store instructions; and
a processor, configured to invoke the instructions from the memory and run the instructions, so that a communication device on which the chip system is installed performs the method in the embodiment shown in FIG. 17.

Optionally, an embodiment of this application further provides a computer program product. The computer program product includes a computer program. When the computer program is run on a computer, the computer is enabled to perform the method in the embodiment shown in FIG. 17.

Specifically, when software is used to implement the radar detection apparatus, all or some of the radar detection apparatus may be implemented in a form of a computer program product. The computer program product includes one or more computer instructions. When the computer program instructions are loaded and executed on the computer, the procedure or functions according to this embodiment of this application are all or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

It should be noted that the processor that is included in the detection apparatus and configured to perform the detection method provided in the embodiment of this application may be a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA), or another programmable logic device, a transistor logic device, a hardware component, or any combination thereof. The processor may implement or execute various example logical blocks, modules, and circuits described with reference to content disclosed in this application. The processor may alternatively be a combination of processors implementing a computing function, for example, a combination of one or more microprocessors, or a combination of a DSP and a microprocessor.

Method or algorithm steps described in combination with the embodiment of this application may be implemented by hardware, or may be implemented by a processor by executing software instructions. The software instructions may include a corresponding software module. The software module may be stored in a random access memory (random access memory, RAM), a flash memory, a read-only memory (read-only memory, ROM), an erasable programmable read-only memory (erasable programmable read-only memory, EPROM), an electrically erasable programmable read-only memory (electrically erasable programmable read-only memory, EEPROM), a register, a hard disk drive, a removable hard disk, a compact disc read-only memory (compact disc read-only memory, CD-ROM), or any other form of storage medium well known in the art. For example, a storage medium is coupled to the processor, so that the processor can read information from the storage medium or write information into the storage medium. Certainly, the storage medium may be a component of the processor. The processor and the storage medium may be disposed in an ASIC. In addition, the ASIC may be disposed in the detection apparatus. Certainly, the processor and the storage medium may alternatively exist in the detection apparatus as discrete components.

It may be understood that FIG. 25 to FIG. 28 show only a simplified design of a corresponding apparatus. In practical application, the signal processing apparatus, namely the radar detection apparatus may include any quantity of transmitters, receivers, processors, controllers, memories and other elements that may exist.

An embodiment of this application further provides a communication system, including at least one radar detection apparatus mentioned in the foregoing embodiments of this application.

An embodiment of this application further provides a communication system, including at least one radar detection apparatus mentioned in the foregoing embodiments of this application and/or at least one central processing unit/central controller. The central processing unit/central controller is configured to control driving of a vehicle and/or processing of another radar detection apparatus based on output of the at least one radar detection apparatus. The central processing unit/central controller may be disposed in the vehicle or another possible location, provided that the control is implemented.

An embodiment of this application further provides a vehicle, including at least one radar detection apparatus mentioned in the foregoing embodiments.

An embodiment of this application further provides a road side unit (RSU), including at least one radar detection apparatus mentioned in the foregoing embodiments.

The foregoing descriptions about implementations allow a person skilled in the art to understand that, for the purpose of convenient and brief description, division into the foregoing function modules is used as an example for illustration. In actual application, the foregoing functions can be allocated to different function modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiments are merely examples. For example, the division into modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as discrete components may or may not be physically separate, and components displayed as units may be one or more physical units, that is, may be located in one place, or may be distributed to a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods described in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A signal processing method, wherein the method comprises:
    performing channel listening based on a first signal and a second signal, wherein the channel listening comprises performing channel listening based on a first listening signal in a first time domain range in time domain and performing channel listening based on a second listening signal in a second time domain range in time domain; and
    determining, based on a result of the channel listening, a first time-frequency resource for target detection, wherein a time domain resource of the first time-frequency resource is the first time domain range;
    the first time domain range and the second time domain range are time domain ranges in L time domain ranges; L is a positive integer greater than 1; any one of the L time domain ranges partially overlaps at least one of other (L−1) time domain ranges; and an absolute value of a difference between time domain start locations of any two of the L time domain ranges is greater than or equal to a first threshold and less than or equal to a second threshold, wherein the first threshold and the second threshold are predefined or determined according to a preconfigured rule based on at least one of an echo delay or a propagation delay; and
    the first listening signal corresponds to a first sub-signal that is of the first signal and that is in at least one first frequency sweep period in the first time domain range, and the second listening signal corresponds to a second sub-signal that is of the second signal and that is in at least one second frequency sweep period in the second time domain range.

2. The method according to claim 1, wherein time domain resources of the first sub-signal and the second sub-signal do not overlap.

3. The method according to claim 1, wherein a difference between start locations of any two adjacent time domain ranges in the L time domain ranges is the same.

4. The method according to claim 3, wherein a difference between start locations of any two adjacent time domain ranges in the L time domain ranges is less than or equal to 1/L Tc, and Tc is a working period of a radar detection apparatus.

5. The method according to claim 1, wherein the method further comprises:
    generating a third signal, wherein a time domain range corresponding to the third signal is a third time domain range; and
    the channel listening further comprises performing channel listening based on a third listening signal in the third time domain range, the third time domain range belongs to the L time domain ranges, the third time domain range is different from the first time domain range and the second time domain range, and the third listening signal corresponds to a third sub-signal that is of the third signal and that is in at least one third frequency sweep period in the third time domain range.

6. The method according to claim 1, wherein the performing channel listening based on a first signal and a second signal comprises:

performing listening in a plurality of listening regions, wherein an absolute value of a difference between start locations of any two of the plurality of listening regions in time domain is an integer multiple of M, and M is predefined or preconfigured.

7. The method according to claim 1, wherein the performing channel listening based on a first signal and a second signal comprises:

performing channel listening on a predefined or configured time domain resource, wherein the time domain resource comprises at least one of the following: a refresh period of a first detection apparatus or a silent refresh period of the first detection apparatus, wherein the refresh period comprises an idle time period and a transmission time period.

8. An apparatus, comprising:
one or more processors, and
a non-transitory storage medium in communication with the one or more processors, wherein the non-transitory storage medium stores program instructions that, when executed by the one or more processors, cause the apparatus to:
perform channel listening based on a first signal and a second signal, wherein the channel listening comprises performing channel listening based on a first listening signal in a first time domain range in time domain and performing channel listening based on a second listening signal in a second time domain range in time domain; and
determine, based on a result of the channel listening, a first time-frequency resource for target detection, wherein a time domain resource of the first time-frequency resource is the first time domain range;
the first time domain range and the second time domain range are time domain ranges in L time domain ranges; L is a positive integer greater than 1; any one of the L time domain ranges partially overlaps at least one of other (L−1) time domain ranges; and an absolute value of a difference between time domain start locations of any two of the L time domain ranges is greater than or equal to a first threshold and less than or equal to a second threshold, wherein the first threshold and the second threshold are predefined or determined according to a preconfigured rule based on at least one of an echo delay or a propagation delay; and
the first listening signal corresponds to a first sub-signal that is of the first signal and that is in at least one first frequency sweep period in the first time domain range, and the second listening signal corresponds to a second sub-signal that is of the second signal and that is in at least one second frequency sweep period in the second time domain range.

9. The apparatus according to claim 8, wherein time domain resources of the first sub-signal and the second sub-signal do not overlap.

10. The apparatus according to claim 8, wherein a difference between start locations of any two adjacent time domain ranges in the L time domain ranges is the same.

11. The apparatus according to claim 10, wherein a difference between start locations of any two adjacent time domain ranges in the L time domain ranges is less than or equal to 1/L Tc, and Tc is a working period of a radar detection apparatus.

12. The apparatus according to claim 8, wherein the instructions further cause the apparatus to generate a third signal, and a time domain range corresponding to the third signal is a third time domain range; and the channel listening further comprises performing channel listening based on a third listening signal in the third time domain range, the third time domain range belongs to the L time domain ranges, the third time domain range is different from the first time domain range and the second time domain range, and the third listening signal corresponds to a third sub-signal that is of the third signal and that is in at least one third frequency sweep period in the third time domain range.

13. The apparatus according to claim 8, wherein the instructions further cause the apparatus to perform listening in a plurality of listening regions, an absolute value of a difference between start locations of any two of the plurality of listening regions in time domain is an integer multiple of M, and M is predefined or preconfigured.

14. The apparatus according to claim 8, wherein the instructions further cause the apparatus to perform channel listening on a predefined or configured time domain resource, the time domain resource comprises at least one of the following: a refresh period of a first detection apparatus or a silent refresh period of the first detection apparatus, wherein the refresh period comprises an idle time period and a transmission time period.

15. A non-transitory computer-readable storage medium, wherein the computer-readable storage medium stores a computer program; and when the computer program is run on a computer, the computer is enabled to:
perform channel listening based on a first signal and a second signal, wherein the channel listening comprises performing channel listening based on a first listening signal in a first time domain range in time domain and performing channel listening based on a second listening signal in a second time domain range in time domain; and
determine, based on a result of the channel listening, a first time-frequency resource for target detection, wherein a time domain resource of the first time-frequency resource is the first time domain range;
the first time domain range and the second time domain range are time domain ranges in L time domain ranges; L is a positive integer greater than 1; any one of the L time domain ranges partially overlaps at least one of other (L−1) time domain ranges; and an absolute value of a difference between time domain start locations of any two of the L time domain ranges is greater than or equal to a first threshold and less than or equal to a second threshold, wherein the first threshold and the second threshold are predefined or determined according to a preconfigured rule based on at least one of an echo delay or a propagation delay; and
the first listening signal corresponds to a first sub-signal that is of the first signal and that is in at least one first frequency sweep period in the first time domain range, and the second listening signal corresponds to a second sub-signal that is of the second signal and that is in at least one second frequency sweep period in the second time domain range.

16. The non-transitory computer-readable storage medium according to claim 15, wherein time domain resources of the first sub-signal and the second sub-signal do not overlap.

17. The non-transitory computer-readable storage medium according to claim 15, wherein a difference between start locations of any two adjacent time domain ranges in the L time domain ranges is the same.

18. The non-transitory computer-readable storage medium according to claim 15, wherein a difference between start locations of any two adjacent time domain ranges in the L time domain ranges is less than or equal to 1/L Tc, and Tc is a working period of a radar detection apparatus.

19. The non-transitory computer-readable storage medium according to claim 15, wherein when the computer program is run on the computer, the computer is enabled to:
generate a third signal, wherein a time domain range corresponding to the third signal is a third time domain range; and
the channel listening further comprises performing channel listening based on a third listening signal in the third time domain range, the third time domain range belongs to the L time domain ranges, the third time domain range is different from the first time domain range and the second time domain range, and the third listening signal corresponds to a third sub-signal that is of the third signal and that is in at least one third frequency sweep period in the third time domain range.

20. The non-transitory computer-readable storage medium according to claim 15, wherein the performing channel listening based on a first signal and a second signal comprises:
performing listening in a plurality of listening regions, wherein an absolute value of a difference between start locations of any two of the plurality of listening regions in time domain is an integer multiple of M, and M is predefined or preconfigured.

* * * * *